US010401952B2

United States Patent
Young et al.

(10) Patent No.: US 10,401,952 B2
(45) Date of Patent: Sep. 3, 2019

(54) REDUCING RENDERING COMPUTATION AND POWER CONSUMPTION BY DETECTING SACCADES AND BLINKS

(71) Applicant: Sony Interactive Entertainment Inc., Tokyo, OT (JP)

(72) Inventors: Andrew Young, San Mateo, CA (US); Jeffrey Roger Stafford, Redwood City, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 160 days.

(21) Appl. No.: 15/087,471

(22) Filed: Mar. 31, 2016

(65) Prior Publication Data
US 2017/0285736 A1    Oct. 5, 2017

(51) Int. Cl.
| G06F 3/03 | (2006.01) |
| G06F 3/01 | (2006.01) |
| H04N 19/124 | (2014.01) |
| G06F 1/16 | (2006.01) |
| G06F 1/3234 | (2019.01) |
| H04N 19/167 | (2014.01) |
| G02B 27/01 | (2006.01) |

(52) U.S. Cl.
CPC .............. *G06F 3/013* (2013.01); *G06F 1/163* (2013.01); *G06F 1/1686* (2013.01); *G06F 1/325* (2013.01); *G06F 3/011* (2013.01); *G06F 3/0304* (2013.01); *H04N 19/124* (2014.11); *H04N 19/167* (2014.11); *G02B 2027/0178* (2013.01)

(58) Field of Classification Search
None
See application file for complete search history.

(56) References Cited

U.S. PATENT DOCUMENTS

| 7,783,061 | B2 | 8/2010 | Zalewski et al. |
| 7,809,145 | B2 | 10/2010 | Mao |
| 8,437,513 | B1 | 5/2013 | Derakhshani et al. |
| 8,786,698 | B2 | 7/2014 | Chen et al. |
| 8,793,620 | B2 | 7/2014 | Stafford |
| 8,824,779 | B1 | 9/2014 | Smyth |
| 8,854,298 | B2 | 10/2014 | Osman et al. |
| 8,907,891 | B2 | 12/2014 | Zhu et al. |
| 9,030,425 | B2 | 5/2015 | Stafford |
| 9,044,675 | B2 | 6/2015 | Stafford et al. |
| 9,084,938 | B2 | 7/2015 | Osman et al. |
| 9,183,683 | B2 | 11/2015 | Osman et al. |
| 9,665,171 | B1 * | 5/2017 | Skogo .................. G06F 3/013 |

(Continued)

OTHER PUBLICATIONS

Lossy compression. (Mar. 25, 2016). Retrieved from https://en.wikipedia.org/w/index.php?title=Lossy_compression&oldid=711892088.*

(Continued)

*Primary Examiner* — Vu Nguyen
(74) *Attorney, Agent, or Firm* — JDI Patent; Joshua Isenberg; Robert Pullman

(57) ABSTRACT

Gaze tracking data may representing a user's gaze with respect to one or more images transmitted to a user are analyzed to determine one or more regions of interest. Compression of the one or more transmitted images is adjusted so that fewer bits are needed to transmit data for portions of an image outside the one or more regions interest than for portions of the image within the one or more regions of interest.

32 Claims, 14 Drawing Sheets

(56) References Cited

U.S. PATENT DOCUMENTS

| | | | |
|---|---|---|---|
| 9,857,871 B2 | 1/2018 | Mallinson | |
| 9,922,253 B2 | 3/2018 | Asbun et al. | |
| 10,169,846 B2 | 1/2019 | Stafford et al. | |
| 10,192,528 B2 | 1/2019 | Young et al. | |
| 2003/0194142 A1* | 10/2003 | Kortum | H04N 19/162 382/239 |
| 2004/0207632 A1 | 10/2004 | Miller et al. | |
| 2006/0239471 A1 | 10/2006 | Mao et al. | |
| 2007/0171367 A1 | 7/2007 | Sebastian et al. | |
| 2008/0188777 A1 | 8/2008 | Bedziouk et al. | |
| 2009/0289895 A1 | 11/2009 | Nakada et al. | |
| 2010/0056274 A1* | 3/2010 | Uusitalo | G02B 27/017 463/31 |
| 2011/0085700 A1* | 4/2011 | Lee | G06Q 30/02 382/103 |
| 2011/0298829 A1 | 12/2011 | Stafford et al. | |
| 2012/0052954 A1 | 3/2012 | Zhu et al. | |
| 2012/0068913 A1 | 3/2012 | Bar-Zeev et al. | |
| 2012/0075062 A1 | 3/2012 | Osman et al. | |
| 2012/0086630 A1 | 4/2012 | Zhu et al. | |
| 2012/0086631 A1 | 4/2012 | Osman et al. | |
| 2012/0122592 A1 | 5/2012 | Stafford et al. | |
| 2012/0154277 A1* | 6/2012 | Bar-Zeev | G02B 27/017 345/158 |
| 2012/0272179 A1 | 10/2012 | Stafford | |
| 2012/0276998 A1 | 11/2012 | Zhu et al. | |
| 2012/0300061 A1 | 11/2012 | Osman et al. | |
| 2013/0050432 A1 | 2/2013 | Perez et al. | |
| 2013/0127980 A1 | 5/2013 | Haddick et al. | |
| 2013/0135196 A1 | 5/2013 | Park et al. | |
| 2013/0257751 A1 | 10/2013 | Stafford | |
| 2013/0279724 A1 | 10/2013 | Stafford et al. | |
| 2014/0013437 A1 | 1/2014 | Anderson et al. | |
| 2014/0043227 A1 | 2/2014 | Skogö et al. | |
| 2014/0092006 A1* | 4/2014 | Boelter | G06F 3/013 345/156 |
| 2014/0247277 A1 | 9/2014 | Guenter et al. | |
| 2014/0292665 A1 | 10/2014 | Lathrop et al. | |
| 2014/0300538 A1 | 10/2014 | Rijnders | |
| 2014/0310256 A1 | 10/2014 | Olsson et al. | |
| 2014/0313120 A1 | 10/2014 | Kamhi | |
| 2014/0333535 A1 | 11/2014 | Stafford | |
| 2014/0354539 A1 | 12/2014 | Skogö et al. | |
| 2014/0361971 A1 | 12/2014 | Sala | |
| 2014/0361976 A1 | 12/2014 | Osman et al. | |
| 2014/0361977 A1 | 12/2014 | Stafford et al. | |
| 2014/0362110 A1 | 12/2014 | Stafford | |
| 2015/0015486 A1 | 1/2015 | Osman et al. | |
| 2015/0085097 A1 | 3/2015 | Larsen | |
| 2015/0085250 A1 | 3/2015 | Larsen | |
| 2015/0085251 A1 | 3/2015 | Larsen | |
| 2015/0094142 A1 | 4/2015 | Stafford | |
| 2015/0169053 A1 | 6/2015 | Bozarth et al. | |
| 2015/0192776 A1* | 7/2015 | Lee | A61B 3/066 345/690 |
| 2015/0213634 A1* | 7/2015 | Karmarkar | G06T 11/60 345/589 |
| 2015/0241967 A1 | 8/2015 | Saripalle et al. | |
| 2015/0254905 A1 | 9/2015 | Ramsby et al. | |
| 2015/0258431 A1 | 9/2015 | Stafford et al. | |
| 2015/0258432 A1 | 9/2015 | Stafford et al. | |
| 2016/0025971 A1* | 1/2016 | Crow | G02B 27/0093 345/156 |
| 2016/0054837 A1 | 2/2016 | Stafford | |
| 2016/0085302 A1 | 3/2016 | Publicover et al. | |
| 2016/0091720 A1 | 3/2016 | Stafford et al. | |
| 2016/0093105 A1 | 3/2016 | Rimon et al. | |
| 2016/0116745 A1 | 4/2016 | Osterhout et al. | |
| 2016/0212538 A1 | 7/2016 | Fullam et al. | |
| 2016/0235323 A1 | 8/2016 | Tadi et al. | |
| 2016/0283455 A1 | 9/2016 | Mardanbegi et al. | |
| 2016/0307297 A1 | 10/2016 | Akenine-Moller et al. | |
| 2017/0123487 A1 | 5/2017 | Hazra et al. | |
| 2017/0123489 A1 | 5/2017 | Guenter | |
| 2017/0124760 A1 | 5/2017 | Murakawa et al. | |
| 2017/0200252 A1 | 7/2017 | Nguyen et al. | |
| 2017/0200308 A1 | 7/2017 | Nguyen et al. | |
| 2017/0285735 A1 | 10/2017 | Young et al. | |
| 2017/0285736 A1 | 10/2017 | Young et al. | |
| 2017/0287446 A1 | 10/2017 | Young et al. | |

OTHER PUBLICATIONS

"3D Face Pose Estimation from a Monocular Camera" by Qiang Ji and Ruong Hu in Image and Vision Computing, vol. 20, Issue 7, Feb. 20, 2002, pp. 499-511.

"An Algorithm for Real-time Stereo Vision Implementation of Head Pose and Gaze Direction Measurement", by Yoshio Matsumoto and Alexander Zelinsky in FG '00 Proceedings of the Fourth IEEE International Conference on Automatic Face and Gesture Recognition, 2000, pp. 499-505.

"Facial feature extraction and pose determination", by Athanasios Nikolaidis Pattern Recognition, vol. 33 (Jul. 7, 2000) pp. 1783-1791.

"Head Pose Estimation in Computer Vision: A Survey" by Erik Murphy, in IEEE Transactions on Pattern Analysis and Machine Intelligence, vol. 31, No. 4, Apr. 2009, pp. 607-626.

Co-Pending U.S. Appl. No. 14/246,062, to Mark Evan Cerny, filed Apr. 5, 2015.

Co-Pending U.S. Appl. No. 14/246,066, to Mark Evan Cerny, filed Apr. 5, 2014.

Co-Pending U.S. Appl. No. 14/927,157, to Jun Murakawa et al., filed Oct. 29, 2015.

Co-Pending U.S. Appl. No. 15/086,645 to Andrew Young and Jeffrey Stafford, filed Mar. 31, 2016.

Co-Pending U.S. Appl. No. 15/087,629 to Andrew Young and Jeffrey Stafford, filed Mar. 31, 2016.

Co-Pending U.S. Appl. No. 15/086,953, to Andrew Young and Jeffrey Stafford, filed Mar. 31, 2016.

Non-Final Office Action for U.S. Appl. No. 15/087,629, dated Feb. 23, 2017.

Non-Final Office Action for U.S. Appl. No. 15/086,645, dated Oct. 11, 2017.

Non-Final Office Action for U.S. Appl. No. 15/086,953, dated Oct. 19, 2017.

Non-Final Office Action for U.S. Appl. No. 15/087,629, dated Nov. 15, 2017.

Bahill, A. Terry, and Jeffrey S. Kallman. "Predicting Final Eye Position Halfway Through a Saccade." IEEE Transactions on Biomedical Engineering BME-30.12 (1983): 781-86. Web. *.

Böhme, Martin, Michael Dorr, Christopher Krause, Thomas Martinetz, and Erhardt Barth. "Eye Movement Predictions Enhanced Bysaccade Detection" Brain Inspired Cognitive Systems: Aug. 29-Sep. 1, 2004. Web. *.

Final Office Action for U.S. Appl. No. 15/086,953, dated Mar. 15, 2018.

Final Office Action for U.S. Appl. No. 15/087,629, dated Apr. 5, 2018.

Han, P., D. R. Saunders, R. L. Woods, and G. Luo. "Trajectory prediction of saccadic eye movements using a compressed exponential model." Journal of Vision 13.8 (2013): 27. Web. *.

Notice of Allowance for U.S. Appl. No. 15/086,645, dated Mar. 13, 2018.

Pagel, Max. "Trajectory-based prediction of saccade landing Points", Bachelorarbeit am Institut fuer Neuro-und Bioinformatik Technisch Naturwissenschaftliche Fakultaet Universitaet zu Luebeck (2007).

Patent Cooperation Treaty; "International Preliminary Report on Patentability" issued in corresponding PCT Application No. PCT/US16/48736, dated Mar. 6, 2018.

Patent Cooperation Treaty; "Notification of Transmittal of the International Search Report and the Written Opinion of the International Searching Authority, or the Declaration" issued in corresponding PCT Application No. PCT/US16/48736, dated Oct. 28, 2016, 2 pages.

(56) References Cited

OTHER PUBLICATIONS

Patent Cooperation Treaty; "International Search Report and Written Opinion of the International Searching Authority" issued in corresponding PCT Application No. PCT/US16/48736, dated Oct. 28, 2016, 8 pages.
Triesch, Jochen, Brian T. Sullivan, Mary M. Hayhoe, and Dana H. Ballard. "Saccade contingent updating in virtual reality." Proceedings of the symposium on Eye tracking research & applications—ETRA '02 (2002): n. pag. Web.
Wikipedia; "Eye tracking", https://en.wikipedia.org/wiki/Eye-tracking, printed on Feb. 26, 2016, pp. 1-8.
Wikipedia; "Optical flow", https://en.wikipedia.org/wiki/Optical-flow-sensor, printed on Feb. 26, 2016, pp. 1-4.
Wikipedia; "Saccade", https://en.wikipedia.org/wiki/Saccades, printed on Feb. 26, 2016, pp. 1-5.
Final Office Action dated Jul. 25, 2017 for U.S. Appl. No. 15/087,629.
Final Office ACtion for U.S. Appl. No. 15/086,953, dated Jan. 4, 2019.
Non-Final Office Action dated Feb. 23, 2017 for U.S. Appl. No. 15/087,629.
Non-Final Office Action dated Nov. 15, 2017 for U.S. Appl. No. 15/087,629.
Non-Final Office Action for U.S. Appl. No. 15/086,953, dated Aug. 29, 2018.
Notice of Allowance for U.S. Appl. No. 15/086,953, dated Mar. 20, 2019.
Notice of Allowance for U.S. Appl. No. 15/087,629, dated Aug. 15, 2018.
Second Notice of Allowance dated Sep. 28, 2018 for U.S. Appl. No. 15/086,645.

* cited by examiner

REDUCING RENDERING COMPUTATION AND POWER CONSUMPTION BY DETECTING SACCADES AND BLINKS

FIELD OF THE DISCLOSURE

Aspects of the present disclosure are related to digital graphics. In particular, the present disclosure is related to varying the quantization within compressed image to maximize compression and minimize perceptible artifacts presented to a user.

BACKGROUND

Graphical display devices having a wide field of view (FOV) have been developed. Such devices include head mounted display (HMD) devices. In an HMD device, a small display device is worn on a user's head. The display device has a display optic in front of one eye (monocular HMD) or each eye (binocular HMD). An HMD device typically includes sensors that can sense the orientation of the device and change the scene shown by the display optics as the user's head moves. Conventionally, most stages of rendering scenes for wide FOV displays are performed by planar rendering where all parts of the screen have the same number of pixels per unit area.

However, rendering for virtual reality (VR) programs, which is often performed in conjunction with HMD devices, requires a higher frame rate than conventional flat screen rendering to prevent a user from experiencing motion sickness. HMD for VR has optical systems to show rendered scenes in wide FOV for immersive experiences. While the screen area around a primary gaze point (sometimes called the foveal region) requires high resolution, the areas outside the primary gaze point are observed only by the peripheral vision and can therefore be rendered at a lower resolution, or may contain less detail. Such rendering is sometimes referred to as foveated rendering.

Research has been performed that seeks to apply foveated rendering at the pixel level by selectively adjusting the pixel resolution for different parts of the screen. See co-pending U.S. patent application Ser. No. 14/246,066, to Mark Evan Cerny, filed Apr. 5, 2014, which is incorporated herein by reference. Furthermore, the foveated rendering concept may be applied at earlier stages of a graphics processing pipeline, such as the geometry level, e.g., by adjusting the tessellation of computer generated objects for different parts of the screen on which they are displayed. See co-pending U.S. patent application Ser. No. 14/927,157 to Jun Murakawa et al. filed Oct. 29, 2015, which is incorporated herein by reference. These approaches, and others, can reduce the computational load on graphics processing hardware by concentrating computational resources on rendering more important parts of an image on a display.

It is within this context that the present disclosure arises.

DETAILED DESCRIPTION

Figure 1A:
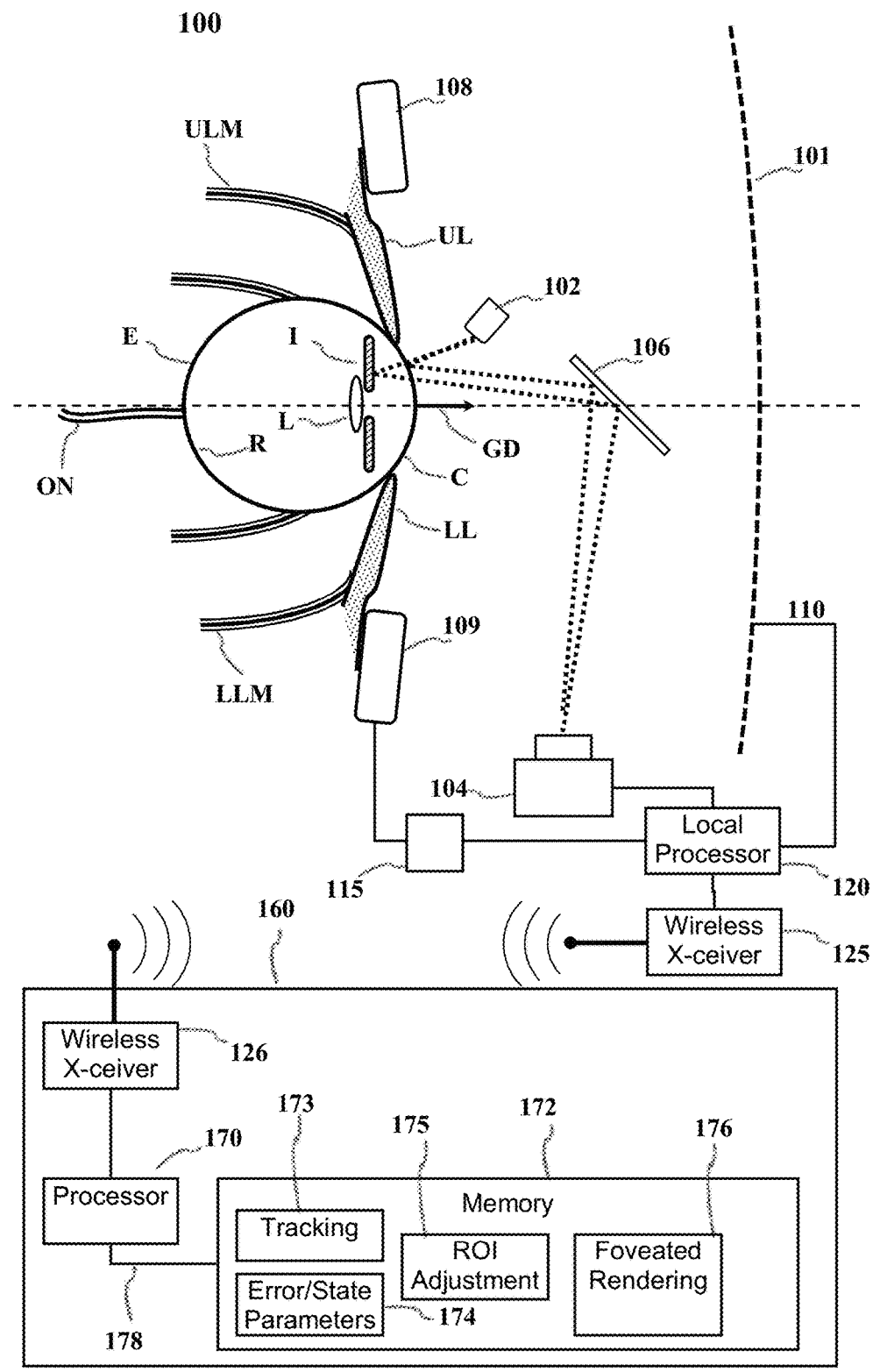
FIGS. 1A-1B are schematic diagrams illustrating gaze tracking within the context of aspects of the present disclosure.

Although the following detailed description contains many specific details for the purposes of illustration, anyone of ordinary skill in the art will appreciate that many variations and alterations to the following details are within the scope of the invention. Accordingly, the illustrative implementations of the present disclosure described below are set forth without any loss of generality to, and without imposing limitations upon, the claimed invention.

Introduction

Eye gaze tracking has use in a wide range of applications, including medical research, automobile technology, computer entertainment and video game programs, control input devices, augmented reality glasses, and more. There are a number of techniques for eye tracking, also known as gaze tracking. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially off line from the optical axis of the camera, causing light directed through the pupil to be reflected away from the optical axis of the camera, resulting in an identifiable dark spot in the image at the location of the pupil. In alternative Dark Pupil tracking systems, an infrared light source and cameras directed at eyes can look at corneal reflections. Such camera based systems track the location of the pupil and corneal reflections which provides parallax due to different depths of reflections gives additional accuracy.

FIG. 1A depicts an example of a dark pupil gaze tracking system 100 that may be used in the context of the present disclosure. The gaze tracking system tracks the orientation of a user's eye E relative to a display screen 101 on which visible images are presented. While a display screen is used in the example system of FIG. 1A, certain alternative embodiments may utilize an image projection system capable of projecting images directly into the eyes of a user. In these embodiments, the user's eye E would be tracked relative to the images projected into the user's eyes. In the example of FIG. 1A, the eye E gathers light from the screen 101 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL,LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 102, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a suitable sensor 104 (e.g., an infrared camera) by a wavelength-selective mirror 106. The mirror transmits visible light from the screen 101 but reflects the non-visible light reflected from the eye.

The sensor 104 is preferably an image sensor, e.g., a digital camera that can produce an image of the eye E which may be analyzed to determine a gaze direction GD from the relative position of the pupil. This image may be produced with a local processor 120 or via the transmission of the obtained gaze tracking data to a remote computing device 160. The local processor 120 may be configured according to well-known architectures, such as, e.g., single-core, dual-core, quad-core, multi-core, processor-coprocessor, cell processor, and the like. The image tracking data may be transmitted between the sensor 104 and the remote computing device 160 via a wired connection (not shown), or wirelessly between a wireless transceiver 125 included in the eye tracking device 110 and a second wireless transceiver 126 included in the remote computing device 160. The wireless transceivers may be configured to implement a local area network (LAN) or personal area network (PAN), via a suitable network protocol, e.g., Bluetooth, for a PAN.

The gaze tracking system 100 may also include an upper sensor 108 and lower sensor 109 that are configured to be placed, for example, respectively above and below the eye E. Sensors 108 and 109 may be independent components, or may alternatively be part of a component 110 worn on the user's head that may include, but is not limited to, any combination of the sensor 104, local processor 120, or inertial sensor 115 described below. In the example system shown in FIG. 1A, sensors 108 and 109 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 108 and lower sensor 109. The electrophysiological information collected by sensors 108 and 109 may include, for example, electroencephalography (EEG), electromyography (EMG), or evoked potential information collected as a result of nerve function in the area(s) surrounding the eye E. Sensors 108 and 109 may also be capable of collecting, for example, mechanomyogram or surface electromyogram information as a result of detecting the muscular vibrations or twitches of the muscles surrounding the eye E. The data collected by sensors 108 and 109 may be delivered with the image tracking data to the local processor 120 and/or the remote computing device 160 as described above.

The gaze tracking system 100 may also be capable of tracking a user's head. Head tracking may be performed by an inertial sensor 115 capable producing signals in response to the position, motion, orientation or change in orientation of the user's head. This data may be sent to the local processor 120 and/or transmitted to the remote computing device 160. The inertial sensor 115 may be an independent component, or may alternatively be part of a component 110 worn on the user's head that may include, but is not limited to, any combination of the sensor 104, local processor 120, or sensors 108 and 109 described above. In alternative embodiments, head tracking may be performed via the tracking of light sources on the component 110.

The remote computing device 160 may be configured to operate in coordination with the eye tracking device 110 and the display screen 101, in order to perform eye gaze tracking and determine lighting conditions in accordance with aspects of the present disclosure. The computing device 160 may include one or more processor units 170, which may be configured according to well-known architectures, such as, e.g., single-core, dual-core, quad-core, multi-core, processor-coprocessor, cell processor, and the like. The computing device 160 may also include one or more memory units 172 (e.g., random access memory (RAM), dynamic random access memory (DRAM), read-only memory (ROM), and the like).

The processor unit 170 may execute one or more programs, portions of which may be stored in the memory 172, and the processor 170 may be operatively coupled to the memory 172, e.g., by accessing the memory via a data bus 178. The programs may be configured to perform eye gaze tracking and determine lighting conditions for the system 100. By way of example, and not by way of limitation, the programs may include gaze tracking programs 173, the execution of which may cause the system 100 to track a user's gaze, e.g., as discussed above, error and state parameter determination programs 174, and foveation rendering programs 175, the execution of which render foveated images to be presented on the display. The foveation rendering programs 175 may use error and/or state parameters to determine potential adjustments that can be made to images presented and to adjust the foveation of images to be presented on the display, respectively, e.g., as discussed below with respect to FIG. 2.

By way of example, and not by way of limitation, the gaze tracking programs 173 may include processor executable instructions which cause the system 100 to determine one or more gaze tracking parameters of the system 100 from eye tracking data gathered with the image sensor 104 and eye movement data gathered from the upper and lower sensors 108 and 109, respectively, while light is emitted from the lighting source 102. The gaze tracking programs 173 may also include instructions which analyze images gathered with the image sensor 104 in order to detect a presence of a change in lighting conditions, e.g., as described below with respect to FIG. 2.

Figure 1B:
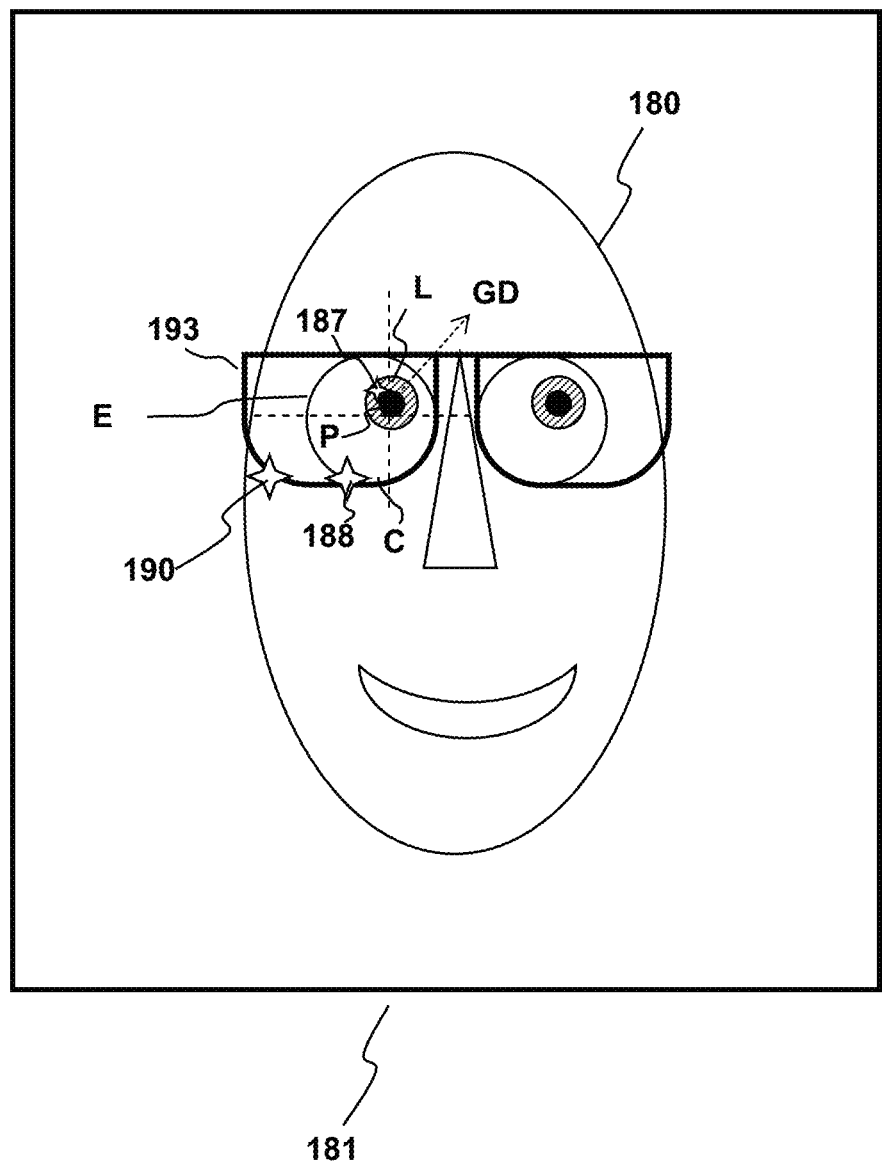

As seen in FIG. 1B, the image 181 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 101, by a straightforward geometric computation of a three-dimensional vector based on the known size and shape of the eyeball. The determined gaze direction GD is capable of showing the rotation and acceleration of the eye E as it moves relative to the screen 101.

As also seen in FIG. 1B, the image may also include reflections 187 and 188 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 190 from a user's eyeglasses 193, if these are worn a user.

Current HMD panels refresh at a constant rate of 90 or 120 Hertz (Hz) depending on the manufacturer. The high refresh rate increases power consumption of the panel and bandwidth requirements of the transmission medium to send frame updates. However, the image displayed on the panel does not always need to be refreshed during events that interrupt the user's visual perception. For example, when a user blinks, visual information is shut off by the eyelids. When a user's eyes undergo a saccade, the brain effectively shuts off interpretation of visual information. Human eyes also exhibit rapid eye movements known as saccades. A phenomenon known as saccadic masking occurs during a saccade. Saccadic masking causes the brain to suppress visual information during eye movements. Power and computational resources devoted to rendering frames during a vision interrupting event, such as a saccade or blink, are therefore wasted.

Many types of displays, such as HMD systems, are strobed systems that utilize persistence of vision to keep the image stable. There is a relatively large variation in the duration of a saccade or blink. For example, a saccade typically lasts from 20 to 200 ms. This corresponds to between 2 and 25 frames at a frame rate of 120 frames per second (fps). Even if it takes 10 ms to detect the start of saccade and the saccade only lasts 20 ms, the graphics system can save one frame, e.g., not render to reduce computation or turn off the display to save power or both. A blink typically lasts from about 100 ms to about 150 ms, which sufficient time for 12 to 18 frames at 120 fps.

As discussed with respect to FIG. 1A, camera-based eye tracking can be augmented with other methods to update eye tracking during a blink phase. Examples of augmentation include providing EEG information in addition to the image information in order to detect nerve impulses that trigger eye muscle activity. This information can also be used help detect the start and end of blinks and saccades, or to predict the duration of blinks and saccades. Eye tracking systems can determine whether the vision system is in a saccade or not by high-pass filtering based on rate of eye movement.

With knowledge that a blink or a saccade has begun and when it will end, a graphics rendering system could selectively disable transmission of frames until the time a user's saccade or blink will finish. Then the system could schedule work to finish the transmission in time to update the display. The end result is a savings in computation time, transmission bandwidth, and power consumption. Computational resources that would otherwise be devoted to graphics may be used for other things, e.g., physics simulations and AI processing for rendering subsequent frames can run during this time.

For further computational savings, gaze tracking may also be analyzed to predict the user's gaze point on the display at the end of the saccade or blink and render the frame using foveated rendering. Furthermore, as the user uses the system over a period of time, software running on the computing device 160 can analyze gaze tracking data to improve detection and estimates of duration estimation and final gaze point for saccades or blinks.

Figure 2:
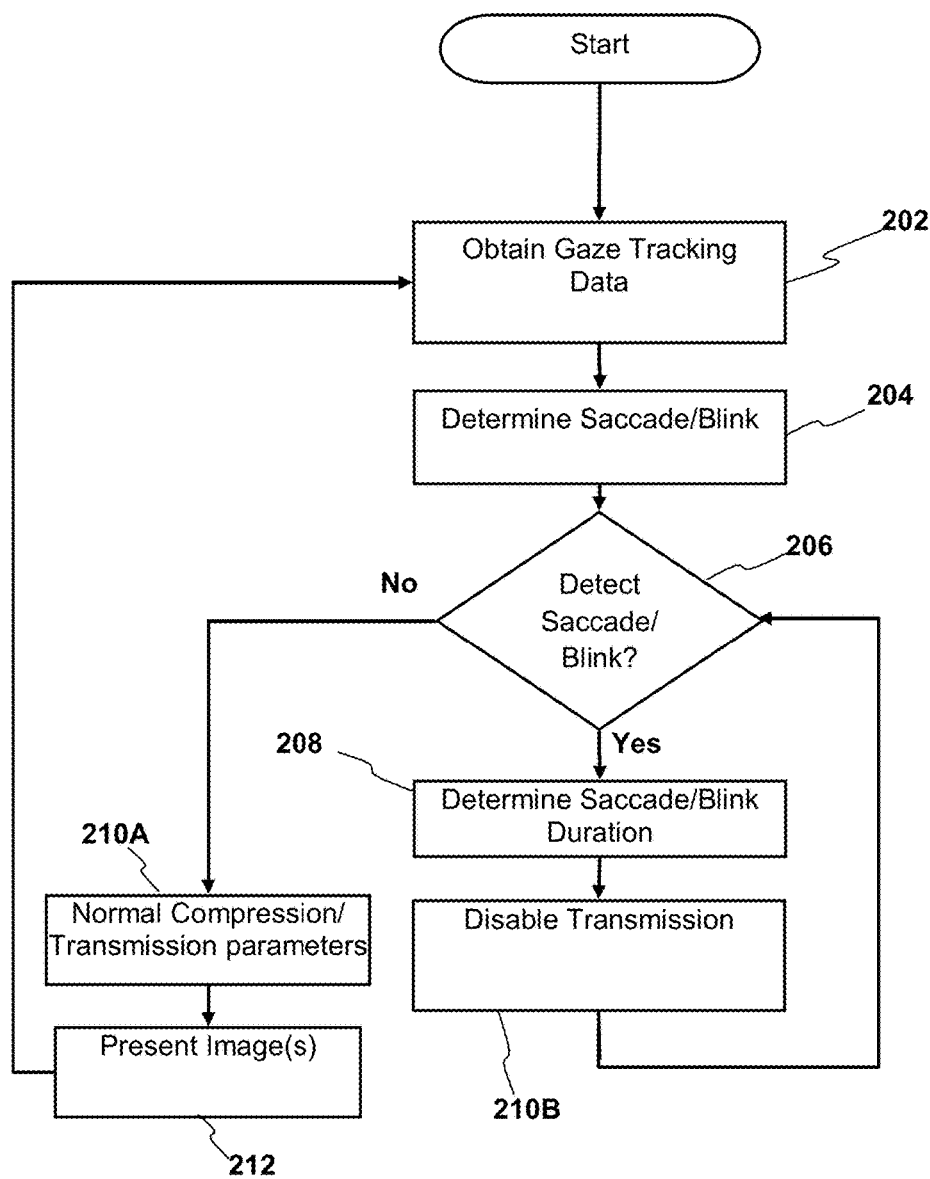
FIG. 2 is a flow diagram depicting a method according to aspects of the present disclosure.

FIG. 2 shows an example method 200 wherein a system could adjust the compression or transmission of graphics transmitted to a user in ways that take into account saccades and/or blinks by a viewer. In this example, gaze tracking data 202 is obtained as discussed with respect to FIGS. 1A-1B. The eye tracking data may then be analyzed to detect a saccade and/or blink, as indicated at 204. If, at 206 no saccade or blink is detected normal transmission of image data to the display may take place, as indicated at 210A followed by presentation of images, as indicated at 212. The normal transmission takes place with normal transmission parameters and/or data compression parameters. If instead, a saccade and/or blink is detected at 206 the transmission of image data may be disabled at 210B for a period that accounts for the nature of the saccade/blink, which may potentially include determining the duration of the saccade blink at 208 through analysis of the gaze tracking data. Determining the saccade/blink duration at 208 may also include predicting when the saccade/blink will end by utilizing historical gaze tracking data of the user. When the system determines that the saccade/blink is ending, normal compression/transmission of the image data resumes, and the resulting images may then be presented at 212.

In alternative implementations the normal transmission at 210A may involve compression of the transmitted images. For example, the images may be selectively compressed based on additional parameters determined from the gaze tracking data. For example, and not by way of limitation, the quantization parameters may be determined for each foveal region of the image presented to the user, and this parameter may be used to selectively compress the foveal regions of the image before transmission and subsequent presentation to the user.

Furthermore, the disabling transmission may involve reducing transmission power, ignoring packet loss or both. Normal compression may resume, or transmission power may be increased and/or packet loss recovery may be reinstituted so that images are transmitted normally following the saccade or blink.

Figure 3:
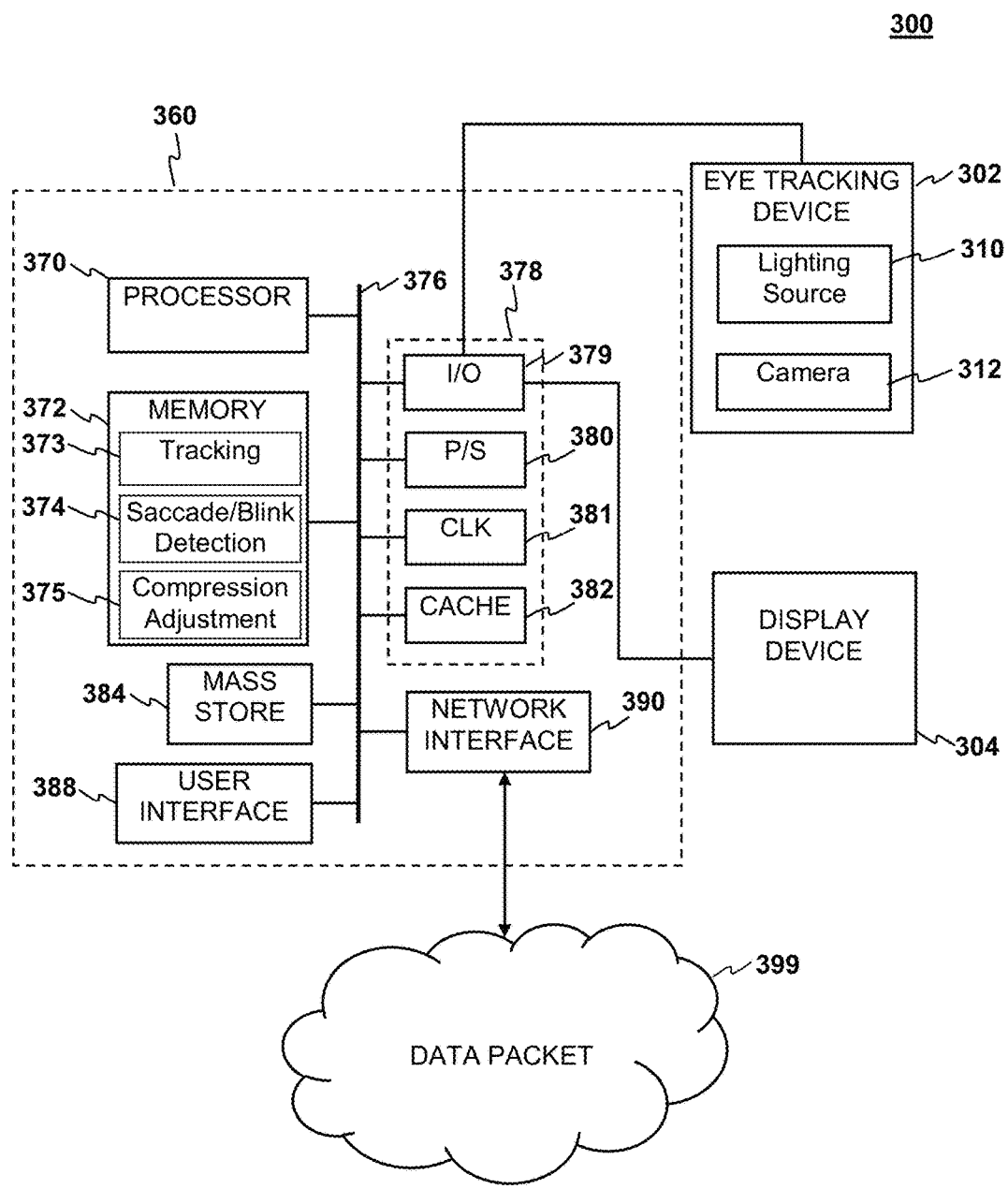
FIG. 3 is a block diagram depicting a system according to aspects of the present disclosure.

FIG. 3 depicts an example system for eye tracking 300 to further illustrate various aspects of the present disclosure. The example system 300 may include a computing device 360 which is coupled to an eye tracking device 302 and a display device 304 in order to perform eye gaze tracking and/or calibration for eye tracking in accordance with aspects of the present disclosure. The display device 304 may be in the form of a cathode ray tube (CRT), flat panel screen, touch screen, or other device that displays text, numerals, graphical symbols, or other visual objects. According to aspects of the present disclosure, the computing device 360 may be an embedded system, mobile phone, personal computer, tablet computer, portable game device, workstation, game console, and the like. Moreover, the computing device 360, the eye tracking device 302, the display device 304, or any combination thereof may form an integral unit or be implemented as separate components which may be in communication with each other.

The eye tracking device 302 may be coupled to the computing device 360, and may include a dynamic lighting source 310 similar to light sources 110 of FIGS. 1A-1B. By way of example, and not by way of limitation, the lighting source 310 may be an invisible lighting source in the form of one or more infrared LEDs, which may be configured to illuminate a user's eyes in order to gather eye tracking data with the sensor 312. The sensor 312 of the eye tracking device may be a detector which is sensitive to light emitted from the light source 310. For example, the sensor 312 may be a camera sensitive to the light source such as an infrared camera, and the camera 312 may be positioned relative to the eye tracking device and the lighting source so that it may capture images of an area illuminated by the lighting source 310.

The computing device 360 may be configured to operate in coordination with the eye tracking device 302 and the display device 304, in order to perform eye gaze tracking and determine lighting conditions in accordance with aspects of the present disclosure. The computing device 360 may include one or more processor units 370, which may be configured according to well-known architectures, such as, e.g., single-core, dual-core, quad-core, multi-core, processor-coprocessor, cell processor, and the like. The computing device 360 may also include one or more memory units 372 (e.g., random access memory (RAM), dynamic random access memory (DRAM), read-only memory (ROM), and the like).

The processor unit 370 may execute one or more programs, portions of which may be stored in the memory 372, and the processor 370 may be operatively coupled to the memory 372, e.g., by accessing the memory via a data bus 376. The programs may be configured to perform eye gaze tracking and determine lighting conditions for the system 300. By way of example, and not by way of limitation, the programs may include gaze tracking programs 373, execution of which may cause the system 300 to track a user's gaze, e.g., as discussed above with respect to FIG. 1, saccade/blink detection programs 374, execution of which analyze gaze tracking information to determine onset and/or duration of a blink or saccade, e.g., as discussed above with respect to FIG. 2, and rendering adjustment programs 375, execution of which varies graphics processing and rendering of images to be presented on the display device 304 to account for saccades and blinks, e.g., as implemented by a method having one or more features in common with the method of FIG. 2. By way of example, and not by way of limitation, the gaze tracking programs 373 may include processor executable instructions which cause the system 300 to determine one or more gaze tracking parameters of the system 300 from eye tracking data gathered with the camera 312 while light is emitted from the dynamic lighting source 310. The gaze tracking programs 373 may also include instructions which analyze images gathered with the camera 312, e.g., as described above with respect to FIG. 1B.

The computing device 360 may also include well-known support circuits 378, such as input/output (I/O) circuits 379, power supplies (P/S) 380, a clock (CLK) 381, and cache 382, which may communicate with other components of the system, e.g., via the bus 376. The I/O circuits may include a wireless transceiver to facilitate communication with similarly configured transceivers on the eye tracking device 302 and display device 379. The processor unit 370 and wireless transceiver may be configured to implement a local area network (LAN) or personal area network (PAN), via a suitable network protocol, e.g., Bluetooth, for a PAN. The computing device 360 may optionally include a mass storage device 384 such as a disk drive, CD-ROM drive, tape drive, flash memory, or the like, and the mass storage device 384 may store programs and/or data. The computing device 360 may also include a user interface 388 to facilitate interaction between the system 300 and a user. The user interface 388 may include a keyboard, mouse, light pen, game control pad, touch interface, or other device.

The system 300 may also include a controller (not pictured) which interfaces with the eye tracking device 302 in order to interact with programs executed by the processor unit 370. The system 300 may also execute one or more general computer applications (not pictured), such as a video game, which may incorporate aspects of eye gaze tracking as sensed by the tracking device 302 and processed by the tracking programs 373, foveation adjustment programs 374, and foveation rendering programs 375.

The computing device 360 may include a network interface 390, configured to enable the use of Wi-Fi, an Ethernet port, or other communication methods. The network interface 390 may incorporate suitable hardware, software, firmware or some combination thereof to facilitate communication via a telecommunications network. The network interface 390 may be configured to implement wired or wireless communication over local area networks and wide area networks such as the Internet. The network interface 390 may also include the aforementioned wireless transceiver that facilitates wireless communication with the eye tracking device 302 and display device 379. The computing device 360 may send and receive data and/or requests for files via one or more data packets 399 over a network.

Foveated Rendering

In some implementations, foveated rendering may augment computational resource savings from leveraging knowledge of blinks or saccadic masking. Foveated rendering can reduce computational complexity in rendering graphics, while still preserving essential details in regions of interest in the image presented by the display. Foveated rendering reduces computation by performing high resolution rendering on regions of interest (ROI) of the displayed image where the fovea is focused and low resolution rendering outside this region. In addition to lowering the computational cost, one can also use these ROIs to compress the frame for transmission. To utilize foveated rendering, an image display device, such as a head-mounted display (HMD) would use eye gaze tracking technology to determine where the user is focusing on the screen.

Foveated rendering may be implemented by adjusting certain parameters of the rendering process based on screen location. Such adjustment may, e.g., vary the pixel resolution of the rendered image based on screen location. Alternatively, the density of vertices used to render three-dimensional objects may vary by screen location.

Using Foveated rendering images as input to compression, one can use varying levels of compression for each rendered region. The output is one or more compression streams with varying levels of compression or quality. For the foveal ROI, the highest quality settings are used giving minimal or no compression. However, for regions outside the fovea, the eye is less sensitive and therefore higher compression is acceptable. The result is a reduction in the bandwidth required for frame transmission while preserving quality of important regions.

Figure 4A:
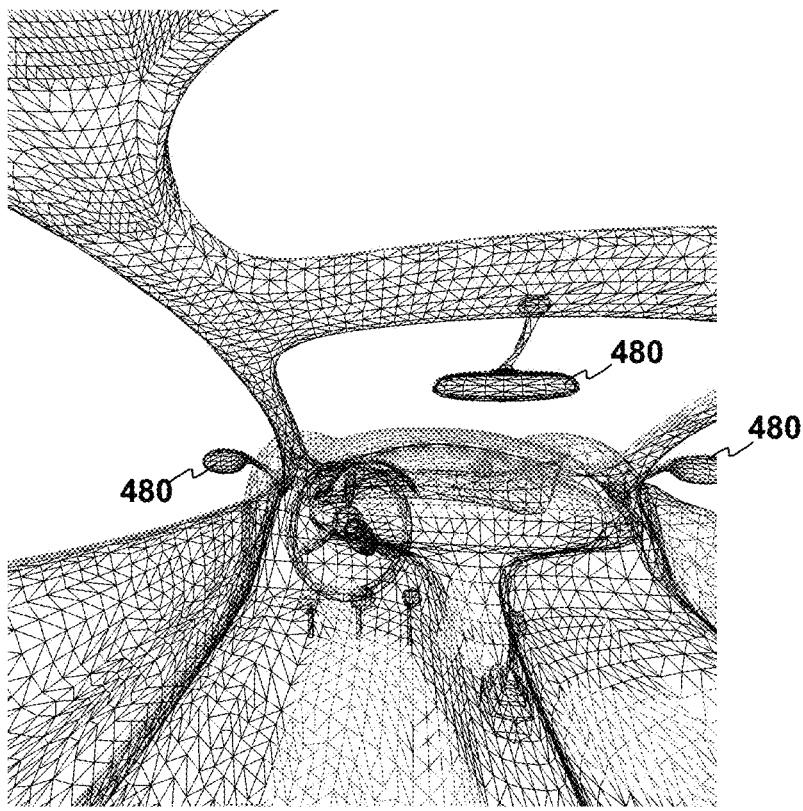
FIG. 4A is a simplified diagram illustrating an example of normal tessellation performed in accordance with the prior art.
Figure 4B:
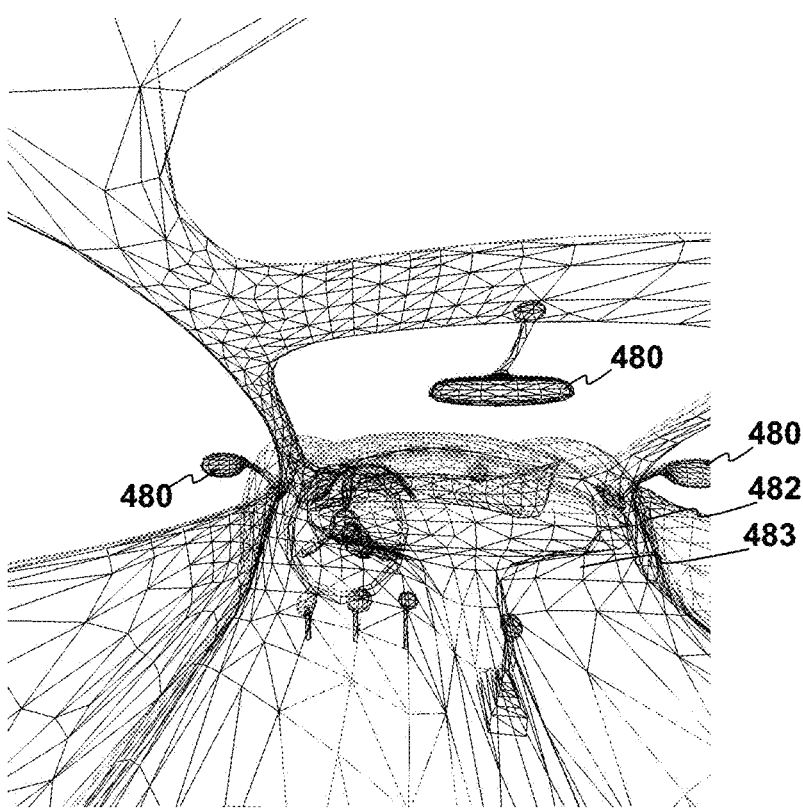
FIG. 4B is a simplified diagram illustrating an example of foveated tessellation in accordance with aspects of the present disclosure.

FIGS. 4A-4B illustrate an example of adjustment of vertex density to implement foveated rendering in the context of a Virtual Reality (VR) environment. In conventional FOV displays, three-dimensional geometry is rendered using a planar projection to the view plane. However, rendering geometry onto displays, especially high FOV view planes, can be very inefficient and result in significant latency and performance issues. These issues can cause the displayed frame rate to drop below desired levels, creating a jarring, non-immersive experience for a user, and potentially inducing motion sickness in a user immersed in a VR environment.

Additionally, regions of the display near the edge of the screen, or regions which the user is not viewing, or not likely to view, hold much less meaningful information than regions near the center or to which a user's attention is currently directed. When rendering a scene conventionally, these regions have the same number of vertices and the time spent rendering equal sized regions on the screen is the same. Other parts of the screen, such as the rear-view mirrors in the driving scene depicted in FIG. 4A, may be more important. These parts of the image are referred to as regions of interest 480.

FIG. 4B illustrates an example of a VR environment in which the scene information is rendered using foveated tessellation in accordance with aspects of the present disclosure. By utilizing foveated tessellation of real-time graphics rendering, detail may be added and subtracted from a 3D mesh for regions of interest 480 and corresponding silhouette edges based on a variety of parameters, e.g., camera distance, user attention, user eye movement, or depth of field. Detail in the areas surrounding regions of interest 480 can be defined as transition regions 482, and detail in these areas may be rendered such that the areas contain less detail than the areas of interest 480 but more detail than the peripheral regions 483. This may be accomplished by rendering the transition regions 482 to establish, for example, a mathematical relationship between the pixel density distributions of the area of interest 480 and the peripheral region 483 (See FIGS. 6C-6D, below). Such foveated tessellation can reduce computational load and or rendering time for an image. Reductions in computational load and/or rendering time may alternatively by achieved in other parts of the graphics processing pipeline by selectively reducing the pixel resolution outside of the regions of interest 480.

Experiments have shown, e.g., that by utilizing foveated tessellation, the rendering time of a 3D mesh or wireframe can be reduced by a factor of roughly 4× or more, as fewer vertex computations are required in rendering the image in the tessellation and certain parts of the graphics pipeline subsequent to tessellation.

In some implementations, subsequent graphics processing may utilize a rasterization stage that approximates a projection of the vertices onto a curved viewport. In such implementations, the density of the projected vertices may be determined for selected portions of the screen space corresponding to the region(s) of interest 480, such that a higher density of vertices is present in the region(s) of interest, while the density of the projected vertices is lower in remaining regions of the screen space. This can be accomplished by reducing the density of vertices for portions of the screen that are determined to be outside the region(s) of interest 480. In alternative embodiments, the density of vertices may be increased in selected portions of the screen space such that a higher density of vertices is present in a portion or portions of interest, and the density of vertices in the remaining portion or portions of the screen space is not increased. Accordingly, aspects of the present disclosure utilize a screen space transformation of the type described above to reduce a GPU's computational load by effectively reducing the number of vertex computations for the area of the screen space that is to be rendered.

Foveated rendering may be limited by the capabilities of the gaze tracking system. Performance of gaze tracking systems depend on a multitude of factors, including the placement of light sources (IR, visible, etc.) and cameras, whether user is wearing glasses or contacts, HMD optics, frame rate, exposure time, camera optics, tracking system latency, rate of eye movement, shape of eye (which changes during the course of the day or can change as a result of movement), eye conditions, e.g., lazy eye, macular degeneration, gaze stability, fixation on moving objects, scene being displayed to user, and user head motion.

In systems and devices that utilize eye tracking, errors in eye tracking and associated latencies in tracking, as well as the inability to track eye state information, cause these systems to need a much greater radius of high resolution on the display than is theoretically needed to preserve the high fidelity for the user. This issue is particularly prevalent in virtual reality systems, wherein performance is dependent on screen resolution. In such systems, high levels of rendering are required in order to maintain an ideal resolution, however, much of rendering performed is unnecessary since a user's eyes only focus on a small part of the screen. Foveated rendering techniques allow for a system to provide high resolution to the foveal region and lower resolution to transitional and/or peripheral regions outside the foveal region. However, even for systems utilizing foveated rendering, the rendered foveal region is often larger than necessary as compared to the theoretical foveal region, as the region is rendered to account for the variability in human vision. An example of this variability involves the speed and accuracy of a user's saccade to fixation.

Aspects of the present disclosure address these problems with an adaptive foveated rendering technique. Using error bounds and information regarding the state of the eye collected with the eye tracking data the system could adjust the fovea rendering radius to compensate for state changes or errors in the tracking results. The fovea rendering radius may be adjusted with respect to state changes occurring in real time, or alternatively, may be adjusted in anticipation of a state change. Additionally, using knowledge of latencies in the system one could scale the fovea region. The end result would allow for more savings in rendering complexity while maintaining the highest possible resolution for the user.

In order to provide the most accurate scaling of the fovea region and maximize the savings in rendering complexity while maintaining the highest possible resolution for the user, aspects of the present disclosure may be configured to determine the size and shape of the foveal region in advance based on a "worst case" scenario that accounts for the variability in human vision, determine estimates of error, state information, and latencies during gaze tracking, and dynamically resize the foveal region to provide the best balance of resolution quality and rendering performance.

Figure 5A:
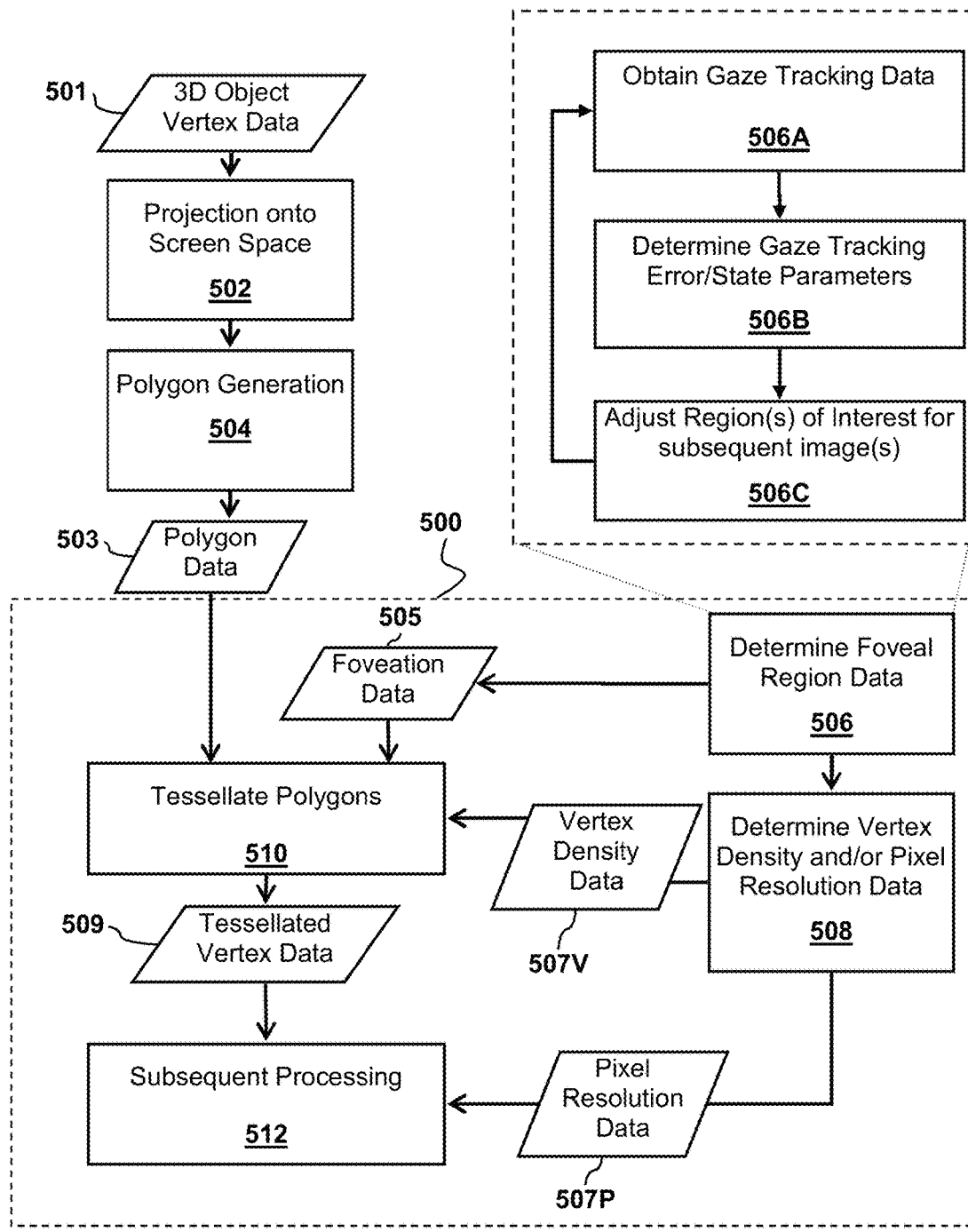
FIGS. 5A-5B are flow diagrams depicting a graphics processing methods according to an aspect of the present disclosure.

According to aspects of the present disclosure, real-time adjustment of foveated rendering of an image containing one or more regions of interest may be implemented by a graphics processing method 500 illustrated in FIG. 5A. To understand the context of the graphics processing method, certain conventional elements of computer graphics processing are shown. Specifically, a computer graphics program may generate three-dimensional object vertex data 501 for one or more objects in three-dimensional virtual space. The object vertex data 501 may represent the coordinates of points in the virtual space that correspond to points on the surfaces of geometric shapes that make up one or more objects. An object may be made up of one or more geometric shapes. The object vertex data 501 may define a set of object vertices that correspond to points on the surfaces of one or more shapes that make up an object. By way of example, and not by way of limitation, each geometric shape may be represented by a shape identifier (e.g., cone, sphere, cube, pyramid, etc.), coordinates in virtual space for a relevant location of the object, e.g., coordinates of a centroid of the shape, and relevant geometric parameters for determining coordinates of a point on the surface of the shape. By way of example, for the case of a sphere, the relevant location could be the location of the center of the sphere and the relevant geometric parameter could be the radius of the sphere.

As indicated at 502, the object vertex data 501 may be subject to a process that projects the object vertices onto a screen space in a conventional manner for 3D graphics processing. In some implementations, the projection may approximate a projection of the vertices onto a curved viewport. Polygons may then be generated from the projected vertices, as indicated at 504. The generation of polygons from the projected vertices may be done in a conventional manner. Specifically, edges may be defined between selected pairs of polygons and selected edges may be associated together as polygons. The resulting polygon data 503 includes information identifying the vertices and edges that make up the polygons. The polygon data 503 is used by the method 500, which tessellates the polygons represented by the polygon data in accordance with aspects of the present disclosure.

The method 500 includes determining foveation data 505 for one or more regions of interest of the screen space, as indicated at 506 and determining vertex density information 507V and/or pixel resolution date 507P, as indicated at 508. The polygon data 503, foveation data 505 and vertex density information 507V are used to tessellate the polygons in accordance with aspects of the present disclosure, as indicated at 510 to produce tessellated vertex data 509. The resulting tessellated vertex data is then used in subsequent graphics processing, as indicated at 512.

Determining the foveation data 505 may involve obtaining the gaze tracking data as indicated at 506A, determining gaze tracking error and/or state parameters at 506B, and adjusting regions of interest at 506C. Gaze tracking data may be obtained, e.g., as discussed above with respect to FIG. 1A-1B, and FIG. 2. The size and/or shape of ROI may be adjusted to compensate for errors in the gaze tracking by determining the error bounds of gaze tracking data. The ROI may also be adjusted to compensate for the state of the user's eye in the gaze tracking data by determining the state information parameters of the gaze tracking data. Such adjustment of foveated rendering is described in detail in U.S. patent application Ser. No. 15/087,471, filed the same date as the present application, the entire contents of which are incorporated by reference herein.

Gaze tracking error parameters determined at 506B may include a confidence interval regarding the current gaze position, which may be determined by examining the rotational velocity and acceleration of a user's eye for change from last position. Alternatively, the gaze tracking error and/or state parameters may include a prediction of future gaze position determined by examining the rotational velocity and acceleration of eye and extrapolating the possible future positions of the user's eye. In general terms, the fixed sampling rate or exposure time of the gaze tracking system may lead to a greater error between the determined future position and the actual future position for a user with larger values of rotational velocity and acceleration. To accommodate for the larger error the size of the foveal region may increase accordingly.

The gaze tracking error parameters may also include a measurement of the eye speed, e.g., the rotation rate. For a slow moving eye, the region of interest may be adjusted at 506C to be smaller, and peripheral and/or transition regions may be adjusted so that they are larger. For a fast moving eye, the size of the foveal region may increase, and the peripheral and/or transition regions may be made smaller.

The regions of interest may also be adjusted at 506C based on state parameters established from the metrics of a user's blink. During a blink, a user's vision may not be focused on the presented images for up to 20-30 frames. However, upon exiting the blink, the user's gaze direction may not correspond to the last measured gaze direction as determined from the gaze tracking data. The metrics of a user's blink or blinks may be established from the gaze tracking data and regions of interest for subsequent images may be adjusted based on those metrics. For example, the metrics may include, but are not limited to, the measured start and end times of the blink of a user, as well as the predicted end times. The adjustment may involve, for example, decreasing the size of the foveal region and increasing the size of the peripheral and/or transition regions during the blink, and increasing the size of the foveal region and decreasing the size of the peripheral and/or transition regions as the blink is determined or predicted to be ending as a result of the blink cycle data.

Gaze tracking state parameters may also be related to saccades. A user's gaze direction will have shifted to a different region of interest when the saccade is exited. The metrics of a user's saccade(s) may be established from the gaze tracking data 506A. These metrics may include, but are not limited to, the measured start and end times of the saccades of a user as well as the predicted end times. The regions of interest for subsequent images may accordingly be adjusted at 506C, e.g., based on the predicted time that will elapse during the saccade. This may involve, for example, decreasing the size of the foveal region while increasing the size of the peripheral and/or transition regions during the saccade, and increasing the size of the foveal region and decreasing the size of the peripheral and/or transition regions as the saccade is determined to be ending as a result of the saccade cycle data. Alternatively, the foveal region may be eliminated completely when it determined that a saccade is either occurring or about to occur, and a new foveal region and peripheral/transition region boundaries may be established based on gaze tracking data 506A obtained during the saccade. Gaze tracking state parameters may also account for a transition in gaze direction between areas of interest as a result of a change in depth of field between presented images that triggers a saccade.

Gaze tracking state parameters may be used to adapt for color blindness. For example, regions of interest may be present in an image presented to a user such that the regions would not be noticeable by a user who has a particular color blindness. Gaze tracking data may be analyzed to determine whether or not the user's gaze identified or responded the area of interest, for example, as a result of the user's changed gaze direction. The region or regions of interest in subsequent images presented to a color blind user may be adjusted order to account for the user's condition, by, for example, utilizing a different color scheme in subsequently presented areas of interest.

Gaze tracking data may also be analyzed to provide a measurement of the gaze stability of a user. Gaze stability may be determined, e.g., by measuring the microsaccadic radius of the user's eye; smaller fixation overshoot and undershoot equates to a more stable gaze in a user. Accordingly, the regions of interest for subsequent images may be adjusted at to be smaller for a user with greater gaze stability, or larger for a user with less gaze stability.

Gaze tracking error or state parameters may also measure a user's ability to fixate on moving objects. These parameters may include the measurement of the capability of a user's eye to undergo smooth pursuit and the maximum object pursuit speed of the eyeball. Typically, a user with excellent smooth pursuit capabilities experiences less jitter in the movement of the eyeball. The region of interest in subsequent images may be adjusted correspondingly at to decrease the size of the region where a user experiences less jitter, or increased where a user experiences increased jitter. The region may also be adjusted at 506C in accordance with a maximum pursuit speed of a user's eye, as a faster measured pursuit speed would require a larger region of interest as compared to the region of interest necessary for a person with a slower pursuit speed. Gaze tracking error parameters may also include determination of eye movement as a precursor to head movement. Offset between head and eye orientation can affect certain error parameters as discussed above, e.g., in smooth pursuit or fixation. As a result, a larger offset between head an eye orientation may require the adjustment of a region of interest for a subsequent image so to make the region larger, whereas a smaller offset would result in a smaller region of interest.

Once the adjustments at 506C have taken place, foveated images may be generated and presented to the user. By way of example, and not by way of limitation, in tessellating the polygons at 510, the foveation data 505 and vertex density information 207V may define tessellation parameters that vary with respect to location in screen space and are used by a hardware or software tessellator to generate a triangle-based tessellation of the polygons. Examples of such tessellation parameters include the so-called TessFactor, which controls the degree of fineness of the mesh generated by the Direct3D 11 programmable graphics pipeline, which is part of Windows 7 from Microsoft Corporation.

In general terms the foveation data 505 and vertex density information 507V are used to modify a conventional tessellation process to account for the fact that not all regions of the screen space are equally important to the one who views images of the screen space on a display. The foveal regions represent portions of the screen space that are determined by an application to be important to the viewer and are therefore allocated a greater share of available graphics computation resources. The foveal region data 205 may include information identifying a location of a centroid of the foveal region in the screen space, a size of the foveal region relative to the screen space, and shape of the foveal region. A foveal region may be determined at 506 by an application to be of interest to a viewer because (a) it is a region the viewer is likely look at, (b) it is a region the viewer is actually looking at, or (c) it is a region it is desired to attract the user to look at.

With respect to (a), the foveal region may be determined to be likely to be looked at in a context sensitive manner. In some implementations, the application may determine that certain portions of the screen space or certain objects in a corresponding three-dimensional virtual space are "of interest" and such objects may be consistently drawn using a greater number of vertices than other objects in the virtual space. Foveal regions may be contextually defined to be of interest in a static or dynamic fashion. As a non-limiting example of static definition, a foveal region may be a fixed part of the screen space, e.g., a region near the center of the screen, if it is determined that this region is the part of the screen space that a viewer is most likely to look at. For example, if the application is a driving simulator that displays an image of a vehicle dashboard and a windshield, the viewer is likely to be looking at these portions of the image. In this example, the foveal region may be statically defined in the sense that the region of interest is a fixed portion of the screen space. As a non-limiting example of dynamic definition, in a video game a user's avatar, fellow gamer's avatars, enemy artificial intelligence (AI) characters, certain objects of interest (e.g., the ball in a sports game) may be of interest to a the user. Such objects of interest may move relative to the screen space and therefore the foveal region may be defined to move with the object of interest.

With respect to (b) it is possible to track the viewers gaze to determine which portion of a display the viewer is looking at. Tracking the viewer's gaze may be implemented by tracking some combination of the user's head pose and the orientation of the pupils of the user's eyes. Some examples of such gaze tracking are described e.g., in U.S. Patent Application Publications Numbers 2015/0085250, 2015/0085251, and 2015/0085097, the entire contents of all of which are incorporated herein by reference. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis *Pattern Recognition*, Vol. 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition*, 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 Feb. 2002, pp 499-511, the entire contents of which are incorporated herein by reference.

With respect to (c), it is a common cinematic device to change the depth of focus of a scene to focus on a portion of interest, e.g., a particular actor who is speaking. This is done to draw the viewer's attention to the portion of the image that is in focus. According to aspects of the present disclosure, a similar effect may be implemented with computer graphics by moving the foveal region to a desired portion of the screen so that that portion has a greater density of vertices and is rendered in greater detail as a result.

In addition to locating a centroid, determining the foveal region data at 506 may also involve determining the size and shape of the foveal region relative to the screen space at run time. The shape of the foveal region, e.g., circular, elliptical, arbitrary may be initialized in advance, and this foveal region may be adjusted dynamically at run-time. In alternative embodiments, the shape of the foveal region is not predetermined, but is established dynamically. In embodiments wherein the shape of the foveal region is initialized in advance, the size of the foveal region may depend on a distance of the viewer from the screen and the size of the screen. Generally, the larger the screen and the closer the viewer is to the screen the smaller the foveal region relative to the screen size.

Conversely, the smaller the screen and the further the viewer is from the screen the larger the foveal region relative to the screen size.

In some implementations, as an alternative to adjusting the tessellation of the polygons, or in addition to it, the method 500 may involve adjusting the pixel resolution according to screen space location using the pixel resolution information 507P.

For fixed displays, such as television sets, tablet computer displays, smart phone displays, and computer monitors, screen size is fixed and may be determined from metadata about the display. Such metadata may be exchanged when the display is connected to a processing system, such as a computer or gaming console. For projection type displays the size of the screen may be determined from additional information regarding the distance from the projector to the wall or other surface on which images are projected.

Figure 5B:
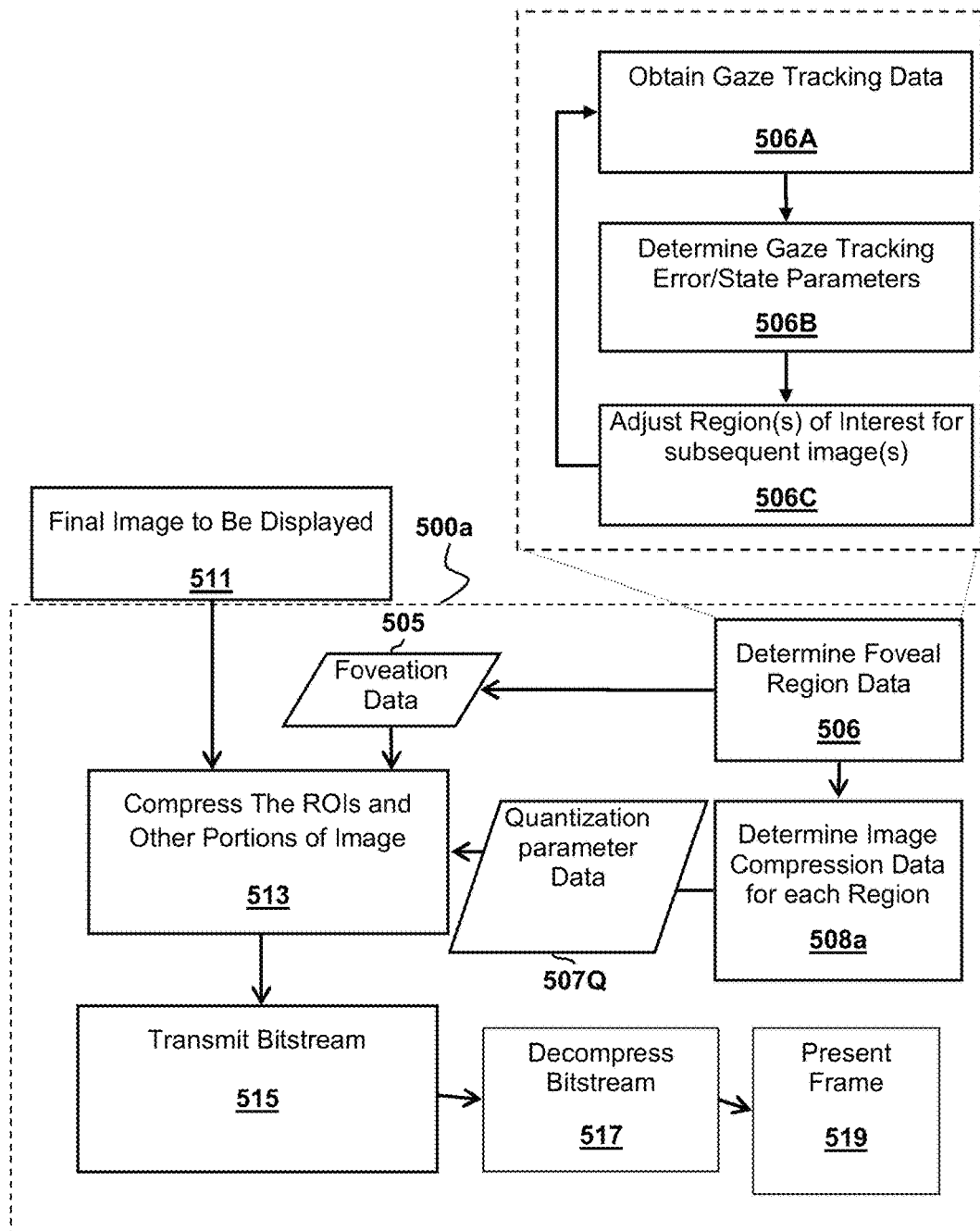

In alternative implementations of the present disclosure, real-time adjustment of foveated rendering of an image containing one or more regions of interest may be implemented by a graphics processing method 500a illustrated in FIG. 5B. In FIG. 5B, the conventional elements of computer graphics processing are not shown, but the final image to be displayed 511 may be generated with respect to the graphics processing method described in FIG. 5A.

The method 500a of FIG. 5B uses selective image compression for the regions of interest and portions of the image outside the regions of interest. The selective image compression uses gaze position to selectively compress different regions around the fovea. The goal of the selective compression is to transmit fewer bits for the portions of the image outside the regions of interest. For example, the image compression data can specify a higher quantization parameter for portions of an image that are outside the regions of interest than are specified for the regions of interest. As a result, the portions of the image outside the regions of interest undergo a higher degree of compression that reduces the number of bits that need to be transmitted but at a cost of lower quality.

The method 500a includes determining foveation data 505 for one or more regions of interest of the screen space, as indicated at 506, and determining image compression (e.g., quantization parameter) data 507Q for the regions of interest as indicated at 508a. The foveation data 505 may be determined as described with respect to FIG. 5A. The image 511, foveation data 505 and image compression data 507Q are used to compress the regions of interest of the image 511, as indicated at 513. The image compression data 507Q is configured so that fewer bits need to be transmitted for regions of the image outside the regions of interest so that data transmission may be concentrated on the more important parts of the image. By way of example, the regions of interest undergo less compression than portions of the image outside the regions of interest. As a result, more bits are used to encode and transmit the regions of interest and fewer bits are used to encode other portions of the image. In alternative implementations, error packet transmission may be omitted for portions of the image outside the regions of interest but not for the regions of interest. The resulting image data is then transmitted via a bitstream, as shown at 515, to either a display or projection system in accordance with certain embodiments of the present disclosure. The bitstream is then decompressed at 517, and the frame is presented to the user at 519.

Figure 6A:
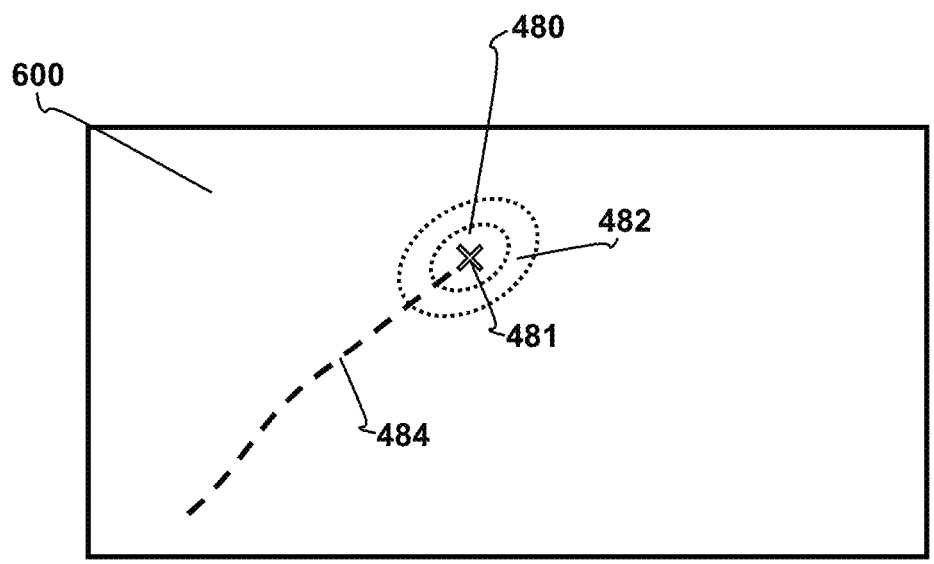
FIG. 6A is a schematic diagram of a screen space illustrating an example of a region of interest in accordance with aspects of the present disclosure.

FIG. 6A illustrates an example of determining a foveal region by screen location in accordance with the above described aspects. In the example shown in FIG. 6A, the screen space is divided into subsections of equal size in pixels. One or more central subsections of an example screen space are desired to maintain or increase the density of tessellated vertices, whereas subsections further from the center have progressively lower densities of tessellated vertices. The foveation data 505 may specify which screen space subsections are part of the region of interest 480 and which are not, wherein the centroid of the region of interest is shown at 481 and the tracked gaze data is shown at 484. In some implementations there may be two or more foveal regions of interest specified by the foveation data 505. The areas of interest may be surrounded by transition areas 482, which may also be specified by the foveation data 505 and which provide a buffer between the highly detailed region of interest 480 and the peripheral region(s) 600. The vertex density information 507V and/or pixel resolution information 507P may be adjusted in accordance with the foveation data so that the density of vertices and/or pixel resolution is highest in the subsection or subsections of the screen containing a portion of interest 480 and progressively lower in subsections further away from the foveal portion, such as the transition area(s) 482 and the peripheral areas 600 described above and additionally shown in FIG. 4B. By way of example, and not by way of limitation, a tessellation factor for a given input polygon (e.g., patch) may be adjusted based on its importance (e.g., as determined from the location of the input polygon in the screen space and the foveation data 505). A tessellation unit, which may be implemented in hardware or software, then generates output polygons (e.g., triangles) at 510 with a desired vertex density as determined by the tessellation factor.

In conjunction with determining the foveal region, the density of vertices and/or pixel resolution in the foveal region and outside the foveal region may be determined, as indicated at 508. By way of example, and not by way of limitation, the vertex density information 507V and/or pixel resolution information 507P may include a maximum density for the foveal region and a minimum density for regions outside the foveal region may be determined. The terms "maximum density" and "minimum density" are used herein as terms of convenience. The maximum generally refers to a density distribution for the foveal region(s) having a higher average vertex and/or pixel density than a corresponding density distribution for the remaining screen space regions. Likewise, the minimum density generally refers to a density distribution for the remaining region(s) that have a lower average vertex density than a corresponding density distribution for the foveal screen space region(s). The transition area(s) 482 may have a pixel density distribution determined by, for example, a mathematical relationship between the pixel density distributions of the area of interest 480 and the peripheral region 483 (See FIGS. 6C-6D, below).

Vertex density and/or pixel resolution values as functions of location in screen space (e.g., maximum and minimum values) may be fixed in advance and stored in memory, in which case determining the values during graphics processing is a trivial matter of retrieving the values from memory. The vertex density and/or pixel resolution values may depend on a number of factors including (a) the available pixel resolution of the screen space, (b) the maximum available graphics processing load capability, (c) the proximity of the viewer to the screen, (d) the size of the screen in pixels, and (e) the nature of the graphics being presented.

With regard to (a), the higher the available pixel resolution in screen space, the higher maximum and minimum density values may be. With regard to (b), greater available graphics processing load capability means that computational savings from adjustment of the vertex density may be less critical, leading to a higher maximum and minimum density values. A reduction on graphics processing load capability means that computational savings from adjustment of the vertex density and/or pixel resolution are more critical, leading to, e.g., a lower value for the minimum density and possibly for the maximum density as well.

With regard to (c), as the viewer moves closer to the screen the need for detail in the foveal region increases (leading to a greater value for the maximum vertex density or pixel resolution) and the need for detail outside the foveal region decreases (allowing for a smaller value for the minimum vertex density or pixel resolution). With regard to (d), as the screen size decreases the foveal region becomes larger relative to the screen. Fewer pixels available on the screen generally means that the minimum vertex density or pixel resolution value cannot be made too small.

In certain implementations, the transition of vertex densities or pixel resolutions (or "falloff") in the transition region 482 between the foveal portion of the region or regions of interest 480 and the remaining portions of the screen may be defined with a closed loop, based on the available computational resources and the complexity of the scene. In certain implementations, a foveation steering element (determining which portion or portions of the screen are the portions of interest), starting and ending mesh density of a rendered scene, and falloff function may be defined statically in advance. In alternative embodiments, these elements may be defined dynamically based on a software agent in the program region that analyzes frame data to determine points or regions of interest. In alternative embodiments, these elements may be predefined by the game developer.

Figure 6B:
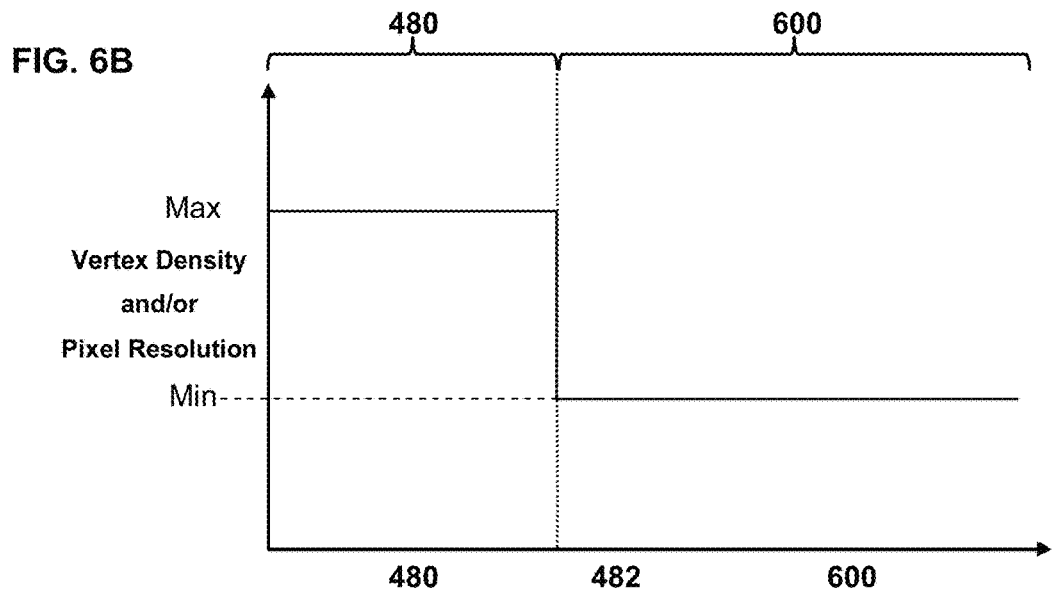
FIGS. 6B-6D are graphs depicting examples of transitions in vertex density over a screen space in accordance with aspects of the present disclosure.
Figure 6C:
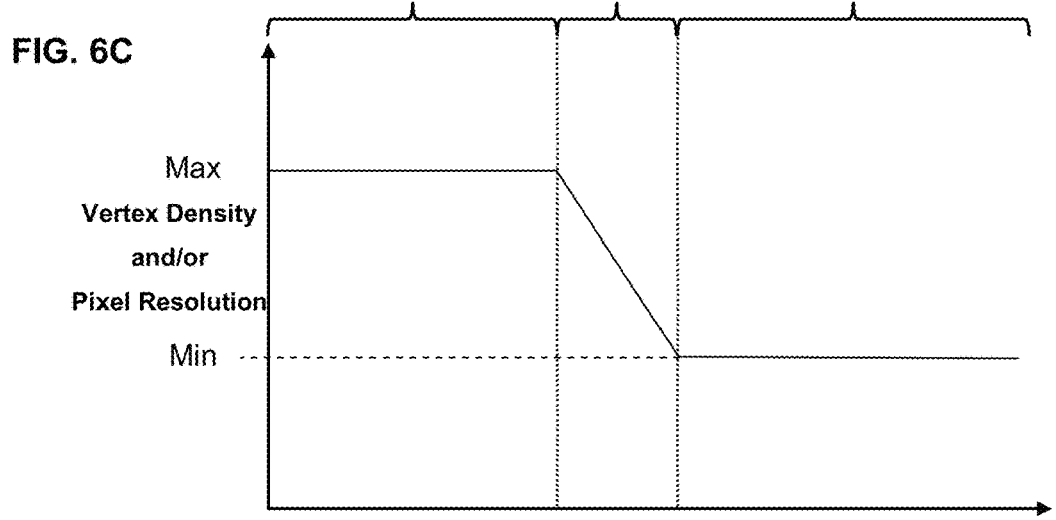
Figure 6D:
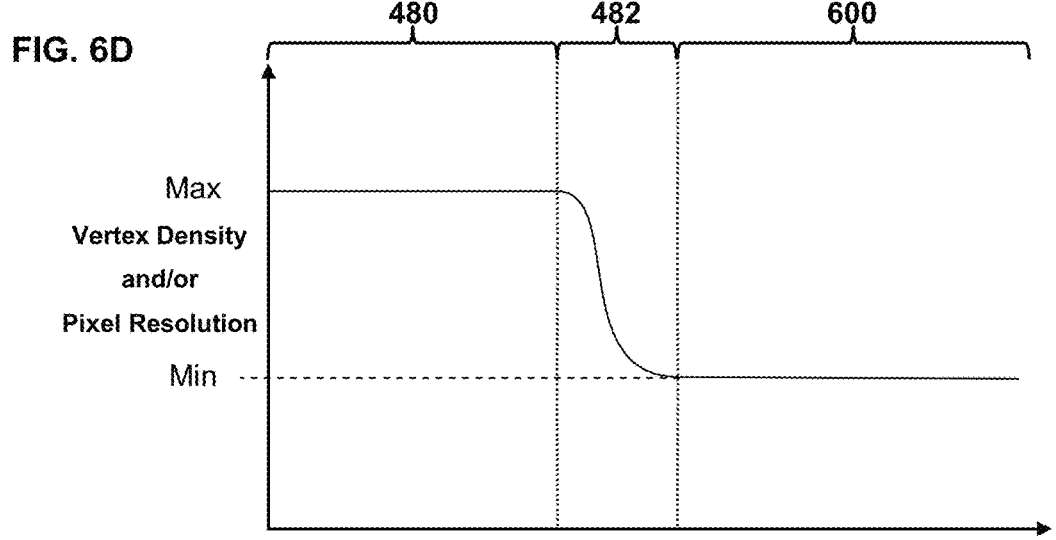

FIGS. 6B, 6C, and 6D illustrate examples of "falloff" in vertex density or pixel resolution between the foveal portions and remaining portions of the screen space. FIG. 6B illustrates an example of a step function transition between Max and Min density with respect to distance from a foveal screen space region. In this case, the vertex density or pixel resolution has the maximum value within the foveal region and the minimum value elsewhere. In alternative implementations, the vertex density or pixel resolution has the maximum value within the region of interest 480, the minimum value in the peripheral region 483 and an intermediate value in the transition region 482. By way of example, and not by way of limitation, the pixel resolution may be 1080P in the region of interest 480, 720P in the transition region 482, and 480P in the peripheral region 483.

FIG. 6C illustrates an example of a linear function transition between Max and Min density with respect to distance from foveal screen space region. In a transition region 482 the density depends linearly on distance from the region of maximum or minimum density, depending on how the coordinate system is defined.

FIG. 6D illustrates an example of a sigmoidal ("S"-shaped) function transition 482 between Max and Min density with respect to distance from foveal screen space region. In general, the integral of any smooth, positive, "bump-shaped" function will be sigmoidal. Examples of sigmoid functions include, but are not limited to, the logistic function, the generalized logistic function, sigmoid functions include the ordinary arctangent, the hyperbolic tangent, the Gudermannian function, and the error function erf(x)=2/$\sqrt{\pi} \int_0^x e^{t^2} dt$), the complementary error function (1−erf(x)), and algebraic functions like $f(x)=x/\sqrt{1+x^2}$.

The logistic function has the form $f(x)=L/1+e^{-k(x-x_0)}$, where:
$x_0$=the x-value of the sigmoid midpoint,
L=the curve's maximum value, and
k=the steepness of the curve.

In additional alternative embodiments, these elements may be dynamically defined by an external signal or signals, e.g., from a gaze tracking system. Gaze tracking signals may include, but are not limited to, a combination of head and pupil tracking. In such embodiments, a user's pupils may be tracked with a camera, as discussed herein. In embodiments wherein the external signal includes head tracking, the tracking of the user's head may include, but is not limited to tracking the user's head with an inertial sensor and/or tracking of light sources on a HMD device. Alternatively the external signal or signals may include, but are not limited to, laser pointer tracking, finger tracking, head tracking, tracking with a controller or peripheral device, tracking another player character in a VR environment, or detecting and interpreting conversation between users.

According to aspects of the present disclosure, certain implementations may utilize existing surface subdivision software, e.g., open source software such as Open Subdiv, to compute a smooth limit surface from a small number of vertices. In such embodiments, polygon tessellation at 510 may tessellate the foveal portion or regions of interest 480 to follow the smooth surface limit. The remaining portions may be tessellated using a larger error tolerance.

Performing subsequent graphics operations at 512 may include something as simple as storing the tessellated vertex data in a memory or transmitting the tessellated vertex data to another processing system. In addition, such subsequent processing may include well-known stages of the graphics processing pipeline. By way of example, and not by way of limitation, primitive assembly is performed on the tessellated vertices to generate a one or more primitives in screen space. Scan conversion may be performed on the one or more primitives to determine which pixel or pixels are part of corresponding primitives. A finished frame may then be generated by performing pixel processing to assign pixel values to the pixel or pixels. In these stages, the pixel resolution may be adjusted for the regions of interest 480 and/or portions outside them to reduce computational load and or rendering time. In some implementations, the finished frame can be stored in the memory or displayed on the display device. Additional details of a graphics pipeline are discussed below with respect to FIG. 7 and FIG. 8.

Graphics Processing System and Apparatus

Figure 7:
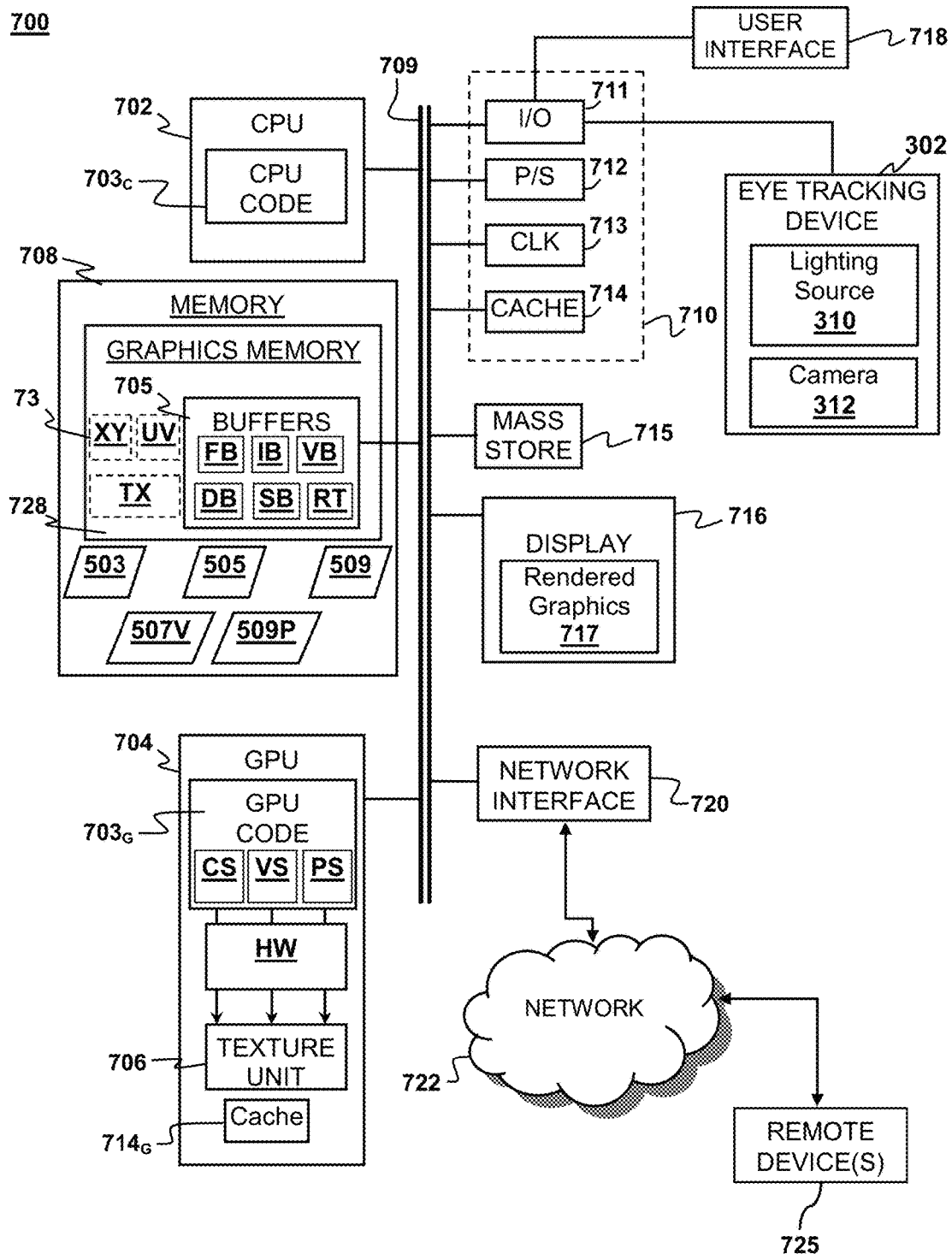
FIG. 7 is a block diagram of a graphics processing system in accordance with aspects of the present disclosure.

Aspects of the present disclosure include graphics processing systems that are configured to implement graphics processing in which effective resolution varies by screen location by adjusting a density of vertices for selected portions of the screen-space with respect to portions of the screen space determined to be portions of interest. By way of example, and not by way of limitation, FIG. 7 illustrates a block diagram of a computer system 700 that may be used to implement graphics processing according to aspects of the present disclosure. According to aspects of the present disclosure, the system 700 may be an embedded system, mobile phone, personal computer, tablet computer, portable game device, workstation, game console, and the like.

The system 700 generally includes a central processor unit (CPU) 702, a graphics processor unit (GPU) 704, and a memory 708 that is accessible to both the CPU and GPU. The system 700 may also include well-known support functions 710, which may communicate with other components of the system, e.g., via a data bus 709. Such support functions may include, but are not limited to, input/output (I/O) elements 711, power supplies (P/S) 712, a clock (CLK) 713 and cache 714. In addition to the cache 714, the GPU 704 may include its own GPU cache 714$_G$, and the GPU may be configured so that programs running on the GPU 704 can read-through or write-though the GPU cache 714$_G$.

The system 700 may be configured to obtain and analyze gaze tracking information for optimization of foveated rendering as discussed above. In some implementations, the system 700 may include the eye tracking device 302 with lighting source 312 and camera 312, as discussed above with respect to FIG. 3. Alternatively, the system may be configured to interoperate with these components, e.g., via the I/O elements 711.

The system 700 may include the display device 716 to present rendered graphics 717 to a user. In alternative implementations, the display device 716 is a separate component that works in conjunction with the system, 700. The display device 716 may be in the form of a flat panel display, head mounted display (HMD), cathode ray tube (CRT) screen, projector, or other device that can display visible text, numerals, graphical symbols or images. In particularly useful implementations, the display 716 is a large field of view (FOV) device having a screen with a field of view of 90 degrees or more (e.g., 114 degrees or more). The display device 716 displays rendered graphic images 717 (e.g., finished frames 760) processed in accordance with various techniques described herein.

The system 700 may optionally include a mass storage device 715 such as a disk drive, CD-ROM drive, flash memory, tape drive, or the like to store programs and/or data. The system 700 may also optionally include a user interface unit 718 to facilitate interaction between the system 700 and a user. The user interface 718 may include a keyboard, mouse, joystick, light pen, game controller, or other device that may be used in conjunction with a graphical user interface (GUI). The system 700 may also include a network interface 720 to enable the device to communicate with other devices 725 over a network 722. The network 722 may be, e.g., a local area network (LAN), a wide area network such as the internet, a personal area network, such as a Bluetooth network or other type of network. These components may be implemented in hardware, software, or firmware, or some combination of two or more of these.

Some virtual reality (VR) applications, e.g., multiplayer online video games or virtual worlds, include a VR Social screen feature that allows spectators at remote devices 725 to view the scene that the user of the system 700 sees. If the foveated rendering is specific to what the user is looking at, images with foveated rendering could be very confusing to spectators. To get around this, the system 700 may create a standard 2D compliant image without the foveated rendering. This image can be shared with spectators, e.g., via the social screen feature.

The CPU 702 and GPU 704 may each include one or more processor cores, e.g., a single core, two cores, four cores, eight cores, or more. The memory 708 may be in the form of an integrated circuit that provides addressable memory, e.g., RAM, DRAM, and the like. The memory 708 may include a dedicated graphics memory 728 that may store graphics resources and temporarily store graphics buffers 705 of data for a graphics rendering pipeline. The graphics buffers 705 may include, e.g., vertex buffers VB for storing vertex parameter values, index buffers IB for holding vertex indices, depth buffers (e.g., Z-buffers) DB for storing depth values of graphics content, stencil buffers SB, frame buffers FB for storing completed frames to be sent to a display, and other buffers. In the example shown in FIG. 7, the graphics memory 728 is shown as part of the main memory. In alternative implementations, the graphics memory 728 could be a separate hardware component, possibly integrated into the GPU 704. The memory 708 (possibly the graphics memory 728) may also temporarily store the polygon data 503, foveation data 505, vertex density data 507V, pixel resolution data 507P and tessellated vertex data 509.

By way of example, and not by way of limitation, the CPU 702 and GPU 704 may access the memory 708 via the bus or busses 709. In some cases, it may be useful for the system 700 to include two or more different buses. The memory 708 may contain data that can be accessed by the CPU 702 and GPU 704. The GPU 704 may include a plurality of compute units configured to perform graphics processing tasks in parallel. Each compute unit may include its own dedicated local memory store, such as a local data share. Alternatively, the compute units may each access the memory 708 or a dedicated graphics memory 728.

The CPU may be configured to execute CPU code 703$_C$, which may include an application that utilizes graphics, a compiler and a graphics API. The CPU code 703$_C$ may also implement gaze tracking and foveation region adjustment, e.g., as discussed above with respect to the method 200 of FIG. 2. The graphics API can be configured to issue draw commands to programs implemented by the GPU. The CPU code 703$_C$ may also implement physics simulations and other functions. The GPU 704 may be configured to operate as discussed above. In particular, the GPU may execute GPU code 703$_G$, may include instructions configured to implement the method 500 of FIG. 7, described above. In addition, the GPU code 703$_G$ may also implement well-known shaders, such as compute shaders CS, vertex shaders VS, and pixel shaders PS. To facilitate passing of data between the compute shaders CS and the vertex shaders VS the system may include one or more buffers 705, which may include a frame buffer FB. The GPU code 703$_G$ may also optionally implement other types of shaders (not shown), such as pixel shaders or geometry shaders. Each compute unit may include its own dedicated local memory store, such as a local data share. The GPU 704 may include one or more texture units 706 configured to perform certain operations for applying textures to primitives as part of a graphics pipeline.

According to certain aspects of the present disclosure, the CPU code $703_C$ and GPU code $703_g$ and other elements of the system 700 are configured to implement a graphics pipeline in which the GPU 704 may receive the polygon data 503. The polygon data 503 can be generated from calculations, e.g., physics simulations of objects in a three-dimensional virtual space, implemented by execution of the CPU code $703_C$ by the CPU 702. The GPU 704 performs a projection of the polygon vertices onto a screen space of the display device 716 and tessellation of the resulting projected polygons. The GPU 704 may adjust the density of the vertices for the tessellation of the polygons in accordance with the foveation data 505 and vertex density data 507V such that the density of vertices is higher in selected foveal portions of the screen space and lower in remaining portions. Alternatively, the GPU 704 may adjust the pixel resolution for portions of images to be presented on the display in accordance with the foveation data 505 and pixel resolution data 507P such that the pixel resolution is higher in selected regions of interest in the screen space and lower in remaining portions. In some implementations, the GPU 704 may adjust the both the vertex density and pixel resolution in accordance with the foveation data 505, the vertex density data 507V and the pixel resolution data 507P such that the vertex density and pixel resolution are higher in selected regions of interest in the screen space and lower in remaining portions.

The GPU 704 may then perform primitive assembly on the vertices to generate a one or more primitives in screen space from the projection of the vertices onto the screen space. Scan conversion may then be performed on the one or more primitives to determine which pixel of screen space are part of corresponding primitives. The GPU 704 may then generate a finished frame 760 by performing pixel processing to assign pixel values to the pixel or pixels that are part of the corresponding primitives. The finished frame can be stored in the memory 708 or graphics memory 728 (e.g., in the frame buffer FB) or displayed on the display device 716.

The projection of the polygon vertices onto the screen space and other related portions of the graphics pipeline can be performed in software, e.g., by a front end implemented as a compute shader CS. Alternatively, the projection of the vertices onto the screen space and other related portions of the graphics pipeline can be implemented by specially designed hardware components HW that are configured to implement these functions.

Aspects of the present disclosure also include implementations in which the foveation data 505 and/or vertex density data 507V and/or pixel resolution data 507P are adjusted dynamically. For example, the foveal region may be defined in conjunction with gaze tracking. In such implementations, the system 700 includes hardware for tracking a user's gaze, i.e., where a user's eye is pointing, and relating this information to a corresponding screen location that the user is looking at, e.g., as discussed above and further explained below. One example of such hardware could include a digital camera in a known location with respect to the screen of the display device 716 and pointed in the general direction of a user. The digital camera could be part of the user interface 718 or a separate component. The CPU code $703_C$ could include image analysis software that analyzes images from the camera to determine (a) if the user is in the image; (b) if the user is facing the camera; (c) if the user is facing the screen; (d) if the user's eyes are visible; (e) the orientation of the pupils of the user's eyes relative to the user's head; and (f) the orientation of the user's head relative to the camera. From the known position and orientation of the camera with respect to the screen, the orientation of the pupils of the user's eyes relative to the user's head and the orientation of the user's head relative to the camera the image analysis software could determine whether the user is looking at the screen and, if so, screen space coordinates for the portion of the screen the user is looking at. The CPU code $703_C$ could then pass these screen coordinates to the GPU code $703_G$, which could determine the subsection or subsections corresponding to one or more regions of interest. The GPU code $703_G$ could then modify the adjustment of vertices and or pixel resolution accordingly so that the resolution is highest in the subsection or subsections containing the foveal portion and progressively lower in subsections further away from the foveal portion, as shown in FIG. 6B.

By way of example, and not by way of limitation, specially designed hardware HW, the texture unit(s) 706, certain types of shaders, and other parts of the graphics pipeline described below may be implemented by special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
- One or more processor cores (e.g., microcontroller, microprocessor or digital signal processor (DSP) cores.
- Memory blocks, e.g., read only memory (ROM), random access memory (RAM), electrically erasable programmable read-only memory (EEPROM) and flash memory.
- Timing sources, such as oscillators or phase-locked loops.
- Peripherals, such as counter-timers, real-time timers, or power-on reset generators.
- External interfaces, e.g., industry standards such as universal serial bus (USB), FireWire, Ethernet, universal asynchronous receiver/transmitter (USART), serial peripheral interface (SPI) bus.
- Analog interfaces including analog to digital converters (ADCs) and digital to analog converters (DACs).
- Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

In some implementations, some or all of the functions of parts of the graphics pipeline may alternatively be implemented by appropriately configured software instructions executed by a software programmable general purpose computer processor, e.g., as compute shaders CS executed by the GPU 704. Such instructions may be embodied in a computer-readable medium, e.g., memory 708, graphics memory 728, or storage device 715.

Graphics Pipeline

Figure 8:
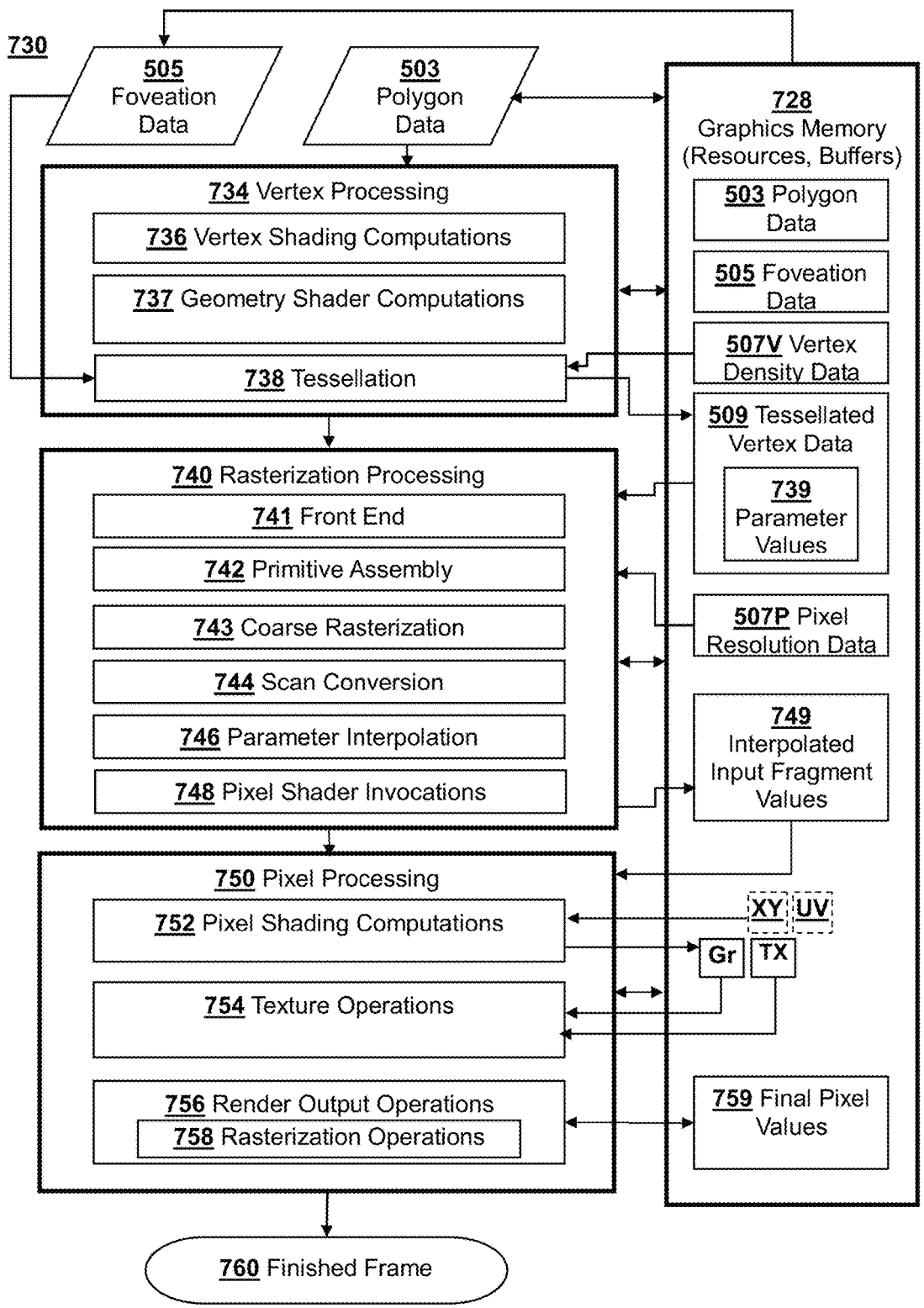
FIG. 8 is a block diagram of a graphics processing pipeline that may be implemented, e.g., by the system of FIG. 7 in accordance with aspects of the present disclosure.

According to aspects of the present disclosure, the system 700 may be configured to implement the method 200 of FIG. 2 and/or the method 500 of FIG. 5 in conjunction with portions of a graphics rendering pipeline. FIG. 8 illustrates an example of a graphics rendering pipeline 730 in accordance with aspects of the present disclosure.

The rendering pipeline 730 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 716. Throughout the pipeline, various resources contained in the graphics memory 728 may be utilized at the pipeline stages and inputs and outputs to the stages may be temporarily stored in buffers contained in the graphics memory before the final values of the images are determined.

The rendering pipeline may operate on input data, such as the polygon data 503 that represents one or more virtual objects defined by a set of vertices that are set up in virtual space and have geometry that is defined with respect to coordinates in the scene. The early stages of the pipeline may include what is broadly categorized as a vertex processing stage 734 in FIG. 8, and this may include various computations to process the vertices of the objects in virtual space. The vertex processing stage may include vertex shading computations 736, which may manipulate various parameter values of the vertices in the scene, such as position values (e.g., X-Y coordinate and Z-depth values), color values, lighting values, texture coordinates, and the like. Preferably, the vertex shading computations 736 are performed by one or more programmable vertex shaders VS of the GPU 704. The vertex processing stage includes additional vertex processing computations, such as geometry shader computations 737 which project the polygon vertices onto the screen space and tessellation shader computations 738, which generate new vertices and new geometries from the projected polygon vertices. Tessellation computations subdivide scene geometries and geometry shading computations to generate new scene geometries beyond those initially set up in the application implemented by the CPU code 703$_C$. It is at this stage that foveated tessellation may occur, and the density of vertices in the 3D mesh or wireframe may be adjusted by tessellation shader computations 738 as defined in accordance with the foveation data 505 and vertex density data 507V. Once the vertex processing stage 734 is complete, the scene is defined by a set of tessellated vertices represented by the tessellated vertex data 509. In addition each tessellated vertex has a set of vertex parameter values 739. The vertex parameter values 739 may include texture coordinates, tangents, lighting values, colors, positions, and the like.

The pipeline 730 may then proceed to rasterization processing stages 740 associated with converting the scene geometry into screen space and a set of discrete picture elements, i.e., pixels. The virtual space geometry (which can be three-dimensional) is transformed to screen space geometry (which is typically two-dimensional) through operations that may essentially compute the projection of the objects and vertices from virtual space to the viewing window (or "viewport) of the scene. Subsets of the vertices are grouped to define sets of primitives in screen space. In some implementations, e.g., for head-mounted displays, the rasterization stage 740 may approximate a projection of the vertices onto a curved viewport, e.g., as described in U.S. patent application Ser. No. 14/246,066, filed Apr. 5, 2014, which is incorporated herein by reference.

The graphics pipeline 730 may pass the foveation data 505 and pixel resolution data 507P to the rasterization processing stages 740 in order to implement foveated rendering in these stages. This may be done as an alternative to or in conjunction with foveated tessellation adjustment of vertices in the 3D mesh or wireframe by the tessellation shader computations 738 defined in accordance with the foveation data 505 and vertex density data 507V.

In accordance the aspects of the present disclosure, the rasterization stages 740 may include a front end 741. The front end can be implemented as part of the rasterization stage or as an intermediate stage between vertex processing 734 and the rasterization stage 740. In the example depicted in FIG. 8, the front end 741 is shown as part of the rasterization stage 740. However, aspects of the present disclosure are not limited to such implementations. In certain implementations, the front end 741 is implemented wholly or partially as a compute shader CS running on the GPU 704. However, aspects of the present disclosure are not limited to such implementations.

Operation of the front end 741 and related aspects of the present disclosure can be understood by referring simultaneously to FIG. 7 and FIG. 8.

The rasterization processing stage 740 depicted in FIG. 8 includes primitive assembly operations 742, which may set up the primitives defined by each set of vertices in the scene. Each vertex may be defined by an index, and each primitive may be defined with respect to these vertex indices, which may be stored in index buffers IB in the graphics memory 728. The primitives preferably include triangles defined by three vertices each, but may also include point primitives line primitives, and other polygonal shapes. During the primitive assembly stage 742, certain primitives may optionally be culled. For example, those primitives whose indices indicate a certain winding order may be considered to be back-facing and may be culled from the scene.

By way of example, and not by way of limitation, where the primitives are in the form of triangles defined by vertices in three dimensional virtual space, the primitive assembly determines where on the screen of the display 716 each triangle is located. Clipping and screen space transformation operations are typically performed by the primitive assembly unit 742. The optional scan conversion operations 744 sample the primitives at each pixel and generate fragments (sometimes referred to as pixels) from the primitives for further processing when the samples are covered by the primitive. The scan conversion operations include operations that take a primitive that has been converted to screen space coordinates and determines which pixels are part of that primitive. In some implementations, multiple samples are taken within the primitives during the scan conversion operations 744, which may be used for anti-aliasing purposes. In certain implementations, different pixels may be sampled differently. For example, some edge pixels may contain a lower sampling density than center pixels to optimize certain aspects of the rendering for certain types of display device 716, such as head mounted displays (HMDs). The fragments (or "pixels") generated from the primitives during scan conversion 744 may have parameter values that may be interpolated to the locations of the pixels from the vertex parameter values 739 of the vertices of the primitive that created them. The rasterization stage 740 may include parameter interpolation operations 746 stage to compute these interpolated fragment parameter values 749, which may be used as inputs for further processing at the later stages of the pipeline.

According to aspects of the present disclosure, between primitive assembly 742 and scan conversion 744 certain operations may take place that account for the fact that different subsections of the screen have different pixel resolutions for foveated rendering. In particular implementations, once the screen location for the vertices of a primitive are known, a coarse rasterization 743 can be done to find all the predefined screen subsections (sometimes referred to herein as coarse rasterization tiles or supertiles) that the primitive overlaps. For each subsection that the primitive overlaps, the vertex locations for the primitive are adjusted to account for the pixel resolutions of the subsection. Scan conversion 744 and subsequent processing stages generate the final pixel values by performing pixel processing only on the specified number of active pixels for the relevant subsection or subsections.

In certain implementations, the GPU 704 may be configured to implement coarse division of primitives between subsections in software, and the projection of the vertices, primitive assembly, and scan conversion in hardware. In some such implementations, the GPU 704 is configured to associate subsection indices to primitive vertices in software, with each subsection index selecting a screen space projection and viewport from a palette implemented in hardware. In other such implementations, the GPU 704 is configured to associate subsection indices to primitive vertex indices in software, with each subsection index selecting a screen space projection and viewport from a palette implemented in hardware.

The graphics pipeline 730 further includes pixel processing operations, indicated generally at 750 in FIG. 8, to further manipulate the interpolated parameter values 749 and perform further operations determining how the fragments contribute to the final pixel values for display 716. According to aspects of the present disclosure, these tasks can be performed in a conventional fashion. The pixel processing tasks include pixel shading computations 752 that further manipulate the interpolated parameter values 749 of the fragments. The pixel shading computations 752 may be performed by a programmable pixel shader or purpose built hardware in the GPU 704. Pixel shader invocations 748 may be initiated based on the sampling of the primitives during the rasterization processing stages 740. The pixel shading computations 752 may output values to one or more buffers 705 in graphics memory 728, sometimes referred to as render targets RT, or if multiple, as multiple render targets (MRTs). MRTs allow pixel shaders to optionally output to more than one render target, each with the same screen dimensions but potentially with a different pixel format.

In some implementations, the adjusted foveation data may include data used to determine pixel shading quality in the one or more regions of interest. This allows for dynamic foveated shader complexity. For example, slightly better parallax occlusion mapping shading in the regions of interest and simpler technique outside the regions of interest.

The pixel processing operations 750 typically include texture mapping operations 754, which may be performed to some extent by one or more shaders (e.g., pixel shaders PS compute shaders CS, vertex shaders VS or other types of shaders) and to some extent by the texture units 706. The pixel shader computations 752 include calculating texture coordinates UV from screen space coordinates XY, and sending the texture coordinates to the Texture Operations 754, and receiving texture data TX. The texture coordinates UV could be calculated from the screen space coordinates XY in an arbitrary fashion, but typically are calculated from interpolated input values or sometimes from the results of previous texture operations. Gradients Gr are often directly calculated from quads of texture coordinates by the texture units 706 (Texture Operations hardware units), but can optionally be calculated explicitly by the pixel shader computations 752 and passed to the texture operations 754 rather than relying on the texture units 706 to perform the default calculation.

The texture operations 756 generally include the following stages, which can be performed by some combination of a pixel shader PS and a texture unit 406. First, one or more texture coordinates UV per pixel location XY are generated and used to provide a coordinate set for each texture mapping operation. Gradient values Gr are calculated from the texture coordinates UV and used to determine a level of detail (LOD) for a texture to apply to the primitive.

The pixel processing 750 generally culminates in render output operations 756, which may include what are commonly known as raster operations (ROP). Rasterization Operations (ROP) is simply run multiple times per pixel, once for each render target among the multiple render targets (MRTs). During the output operations 756, the final pixel values 759 may be determined in a frame buffer, which may optionally include merging fragments, applying stencils, depth tests, and certain per sample processing tasks. The final pixel values 759 include the collected output to all active render targets (MRTs). The GPU 704 uses the final pixel values 759 to make up a finished frame 760, which may optionally be displayed on the pixels of the display device 716 in real-time.

According to aspects of the present disclosure, the graphics pipeline 730 may implement modified rasterization processing 740 and/or modified pixel processing 750 in which the screen resolution and computational load for processing of pixels varies according to screen space location using the foveation data 505 and pixel resolution data 507P. Examples of such modified graphics processing are described e.g., in co-pending U.S. patent application Ser. Nos. 14/246,066 and 14/246,062, both of which were filed Apr. 5, 2014, the entire contents of both of which are herein incorporated by reference. By modifying the graphics pipeline to concentrate computational resources on foveal regions of the screen space the overall computational load throughout the graphics pipeline may be reduced. By way of example, in some implementations, the CPU code $703_C$, GPU code $703_G$, and texture unit 706 may be further configured to implement modifications to texture mapping operations in conjunction with screen location dependent variable resolution. In particular, a pixel shader PS and texture unit 706 can be configured to generate one or more texture coordinates UV per pixel location XY to provide a coordinate set for one or more texture mapping operations, calculate gradient values Gr from the texture coordinates UV and use the gradient values to determine a level of detail (LOD) for a texture to apply to the primitive. These gradient values can be adjusted to account for the variable resolution as well as deviation from orthonormality in the sample locations.

Although examples are described herein with respect to head mounted display (HMD) applications, aspects of the present disclosure are not limited to such implementations. HMD implementations represent a relatively straightforward implementation because the relative locations of the user's eyes and the display screen remain more or less fixed. In principle, however, the disclosed system and method may be adapted to any image display system that can work with gaze tracking. The gaze tracking system may be modified to track the location and orientation of the user's head and eye(s) relative to the display screen in implementations where these are not fixed.

Figure 9A:
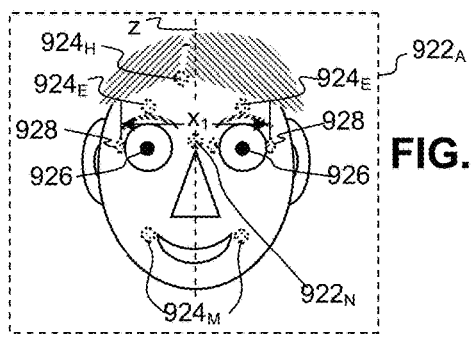
FIGS. 9A-9H are schematic diagrams illustrating examples of the use of eye gaze and face tracking in conjunction with embodiments of the present invention.
Figure 9C:
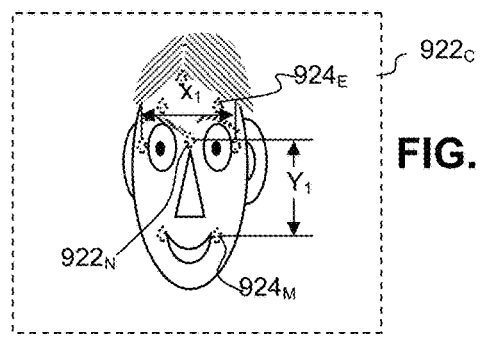
Figure 9B:
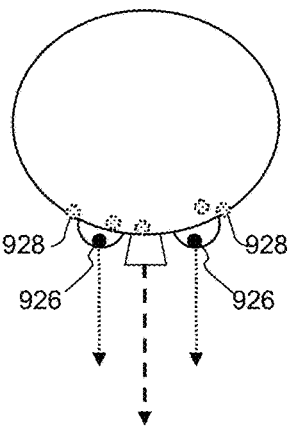
Figure 9D:
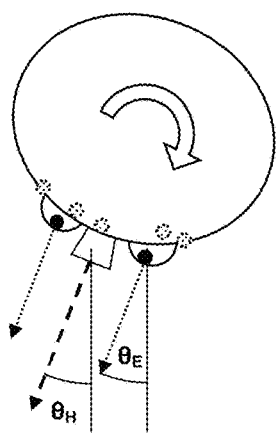

FIGS. 9A-9H illustrate examples of the use of facial orientation and eye gaze direction in conjunction with aspects of the present disclosure. As seen in FIG. 9A a face 920 of a user may appear in an image $922_A$ obtained with a camera trained on the user. Such cameras are common features of devices such as laptop computers, smart phones, and tablet computers. Image analysis software may identify reference points on the face 920. The software may characterize certain of these reference points, e.g., located at the corners of the mouth $924_M$, the bridge of the nose $924_N$, the part in the hair $924_H$, and at the tops of the eyebrows $924_E$, as being substantially fixed relative to the face 920. The software may also identify the pupils 926 and corners 928 of the user's eyes as reference points and determine the location of the pupils relative to the corners of the eyes. In some implementations, the centers of the user's eyes can be estimated from the locations of the pupils 926 and corners 928 of eyes. Then, the centers of eyes can be estimated and the locations of pupils can be compared with the estimated locations of the centers. In some implementations, face symmetry properties can be used.

The software can determine the user's facial characteristics, e.g., head tilt angle and eye gaze angle from analysis of the relative locations of the reference points and pupils 926. For example, the software may initialize the reference points $924_E$, $924_H$, $924_M$, $924_N$, 928 by having the user look straight at the camera and register the locations of the reference points and pupils 926 as initial values. The software can then initialize the head tilt and eye gaze angles to zero for these initial values. Subsequently, whenever the user looks straight ahead at the camera, as in FIG. 9A and the corresponding top view shown in FIG. 9B, the reference points $924_E$, $924_H$, $924_M$, $924_N$, 928 and pupils 926 should be at or near their initial values.

By way of example and not by way of limitation, the pose of a user's head may be estimated using five reference points, the outside corners 928 of each of the eyes, the outside corners $924_M$ of the mouth, and the tip of the nose (not shown). A facial symmetry axis may be found by connecting a line between a midpoint of the eyes (e.g., halfway between the eyes' outside corners 928) and a midpoint of the mouth (e.g., halfway between the mouth's outside corners $924_M$). A facial direction can be determined under weak-perspective geometry from a 3D angle of the nose. Alternatively, the same five points can be used to determine the head pose from the normal to the plane, which can be found from planar skew-symmetry and a coarse estimate of the nose position. Further details of estimation of head pose can be found, e.g., in "Head Pose Estimation in Computer Vision: A Survey" by Erik Murphy, in *IEEE TRANSACTIONS ON PATTERN ANALYSIS AND MACHINE INTELLIGENCE*, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis *Pattern Recognition*, Vol. 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in *FG '00 Proceedings of the Fourth IEEE International Conference on Automatic Face and Gesture Recognition*, 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in *Image and Vision Computing*, Vol. 20, Issue 7, 20 Feb. 2002, pp 499-511, the entire contents of which are incorporated herein by reference.

When the user tilts his head, the relative distances between the reference points in the image may change depending upon the tilt angle. For example, if the user pivots his head to the right or left, about a vertical axis Z the horizontal distance $x_1$ between the corners 928 of the eyes may decrease, as shown in the image $922_C$ depicted in FIG. 9C. Other reference points may also work, or be easier to detect, depending on the particular head pose estimation algorithm being used. The amount change in the distance can be correlated to an angle of pivot $\theta_H$ as shown in the corresponding top view in FIG. 1E. It is noted that if the pivot is purely about the Z axis the vertical distance $Y_1$ between, say, the reference point at the bridge of the nose $924_N$ and the reference points at the corners of the mouth $924_M$, would not be expected to change significantly. However, it would be reasonably expected for this distance $y_1$ to change if the user were to tilt his head upwards or downwards. It is further noted that the software may take the head pivot angle $\theta_H$ into account when determining the locations of the pupils 926 relative to the corners 928 of the eyes for gaze direction estimation. Alternatively the software may take the locations of the pupils 926 relative to the corners 928 of the eyes into account when determining head pivot angle $\theta_H$. Such an implementation might be advantageous if gaze prediction is easier, e.g., with an infrared light source on a hand-held device, the pupils could be located relatively easily. In the example, shown in FIG. 9C and FIG. 9D, the user's eye gaze angle $\theta_E$ is more or less aligned with the user's head tilt angle. However, because of the pivoting of the user's head and the three-dimensional nature of the shape of the eyeballs, the positions of the pupils 926 will appear slightly shifted in the image $922_D$ compared to their positions in the initial image $922_A$.

Figure 9E:
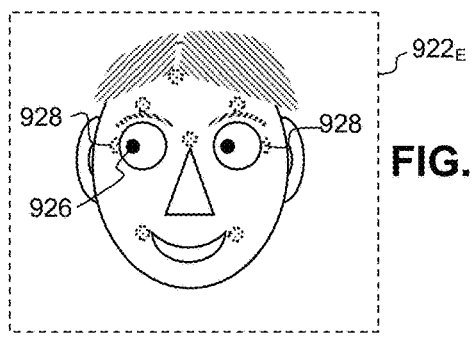
Figure 9G:
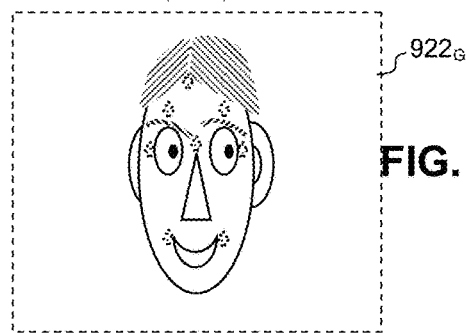
Figure 9F:
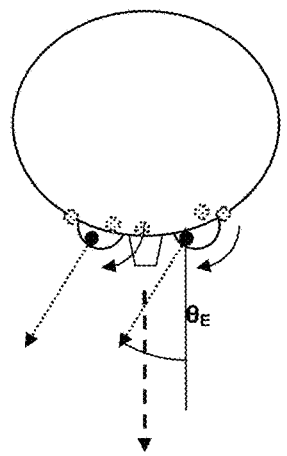

In some situations, the user may be facing the camera, but the user's eye gaze is directed elsewhere, e.g., as shown in FIG. 9E and the corresponding top view in FIG. 9F. In this example, the user's head is tilt angle $\theta_H$ is zero but the eye gaze angle $\theta_E$ is not. Instead, the user's eyeballs are rotated counterclockwise, as seen in FIG. 9F. Consequently, the reference points $924_E$, $924_H$, $924_M$, $124_N$, $928$ are arranged as in FIG. 9A, but the pupils 126 are shifted to the left in the image $922_E$.

Figure 9H:
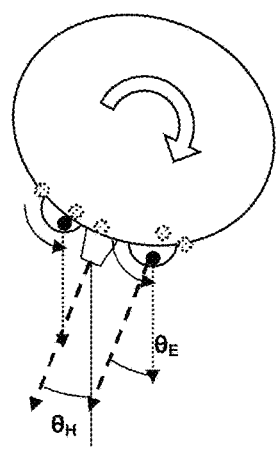

It is noted that the user's head may pivot in one direction and the user's eyeballs may pivot in another direction. For example, as illustrated in FIG. 9H and FIG. 9I, the user 101 may pivot his head clockwise and rotate his eyeballs counterclockwise. Consequently, the reference points $924_E$, $924_H$, $924_M$, $924_N$, $928$ are shifted as in FIG. 9D, but the pupils 926 are shifted to the right in the image $922_G$ shown in FIG. 9G. The gaze tracking system 100, as described in FIGS. 1A-1B, may take this configuration or any of the configurations described above into account in determining the gaze direction GD of the user's eye E.

As may be seen from the foregoing discussion it is possible to track certain user facial orientation characteristics using just a camera. However, many alternative forms of facial orientation characteristic tracking setups could also be used. FIGS. 10A-10E illustrate examples of five facial orientation characteristic tracking systems that, among other possible systems, can be implemented according to embodiments of the present invention.

Figure 10A:
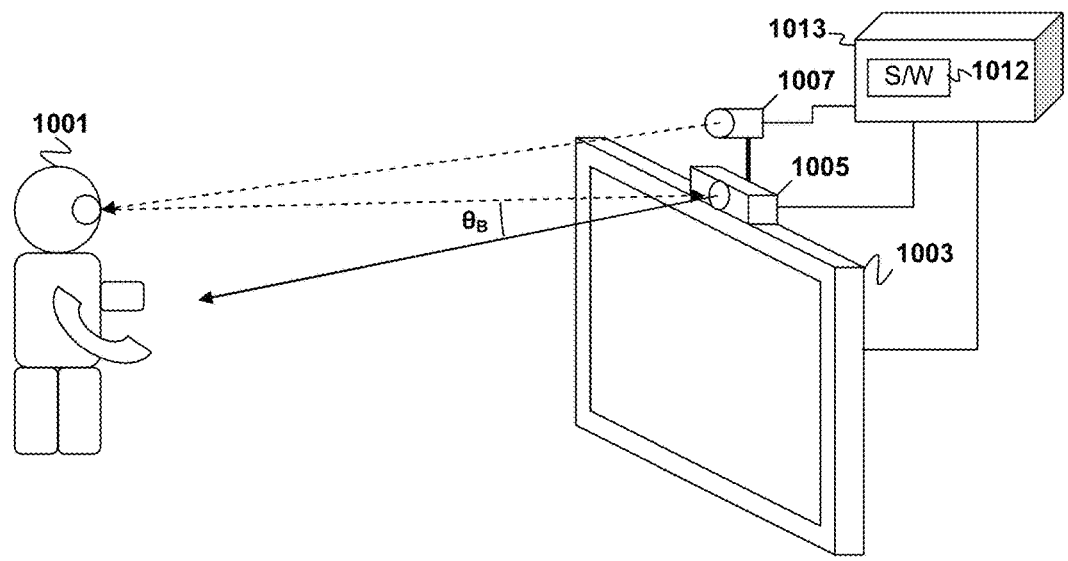
FIG. 10A-10D are schematic diagrams illustrating facial orientation characteristic tracking setups according to aspects of the present disclosure.

In FIG. 10A, the user 1001 is facing a camera 1005 and infrared light sensor 1007, which are mounted on top of a visual display 1003. To track the user's head tilt angle, the camera 1005 may be configured to perform object segmentation (i.e., track user's separate body parts) and then estimate the user's head tilt angle from the information obtained. The camera 1005 and infrared light sensor 1007 are coupled to a processor 1013 running software 1013, which may be configured as described above. By way of example, and not by way of limitation, object segmentation may be accomplished using a motion model to describe how the image of a target might change in accordance to different possible movements of the object. It is noted that embodiments of the present invention may use more than one camera, for example, some implementations may use two cameras. One camera can provide a zoomed-out image of the field of view to locate the user, and a second camera can zoom-in and focus on the user's face to provide a close-up image for better head and gaze direction estimation.

A user's eye gaze direction may also be acquired using this setup. By way of example, and not by way of limitation, infrared light may be initially directed towards the user's eyes from the infrared light sensor 1007 and the reflection captured by the camera 1005. The information extracted from the reflected infrared light will allow a processor coupled to the camera 1005 to determine an amount of eye rotation for the user. Video based eye trackers typically use the corneal reflection and the center of the pupil as features to track over time.

Thus, FIG. 10A illustrates a facial orientation characteristic tracking setup that is configured to track both the user's head tilt angle and eye gaze direction in accordance with an embodiment of the present invention. It is noted that, for the purposes of example, it has been assumed that the user is straight across from the display and camera. However, embodiments of the invention can be implemented even if the user is not straight across from the display 1003 and/or camera 1005. For example, the user 1001 can be +45° or −45° to the right/left of display. As long as the user 1001 is within field of view of the camera 205, the head angle $\theta_H$ and eye gaze $\theta_E$ can be estimated. Then, a normalized angle can be computed as a function of the location of user 1001 with respect to the display 1003 and/or camera 1005 (e.g. body angle $\theta_B$ as shown in FIG. 10A), the head angle $\theta_H$ and eye gaze $\theta_E$. By way of example and not by way of limitation, if the user 1001, is located such that the body angle $\theta_B$ is +45° and if the head is turned at an angle $\theta_H$ of −45°, the user 1001 is fixing the deviation of the body from the display 1003 by turning his head, and this is almost as good as having the person looking straight at the display. Specifically, if, e.g., the user's gaze angle $\theta_E$ is zero (i.e., the user's pupils are centered), the normalized angle (e.g., $\theta_B+\theta_H+\theta_E$) is zero.

Figure 10B:
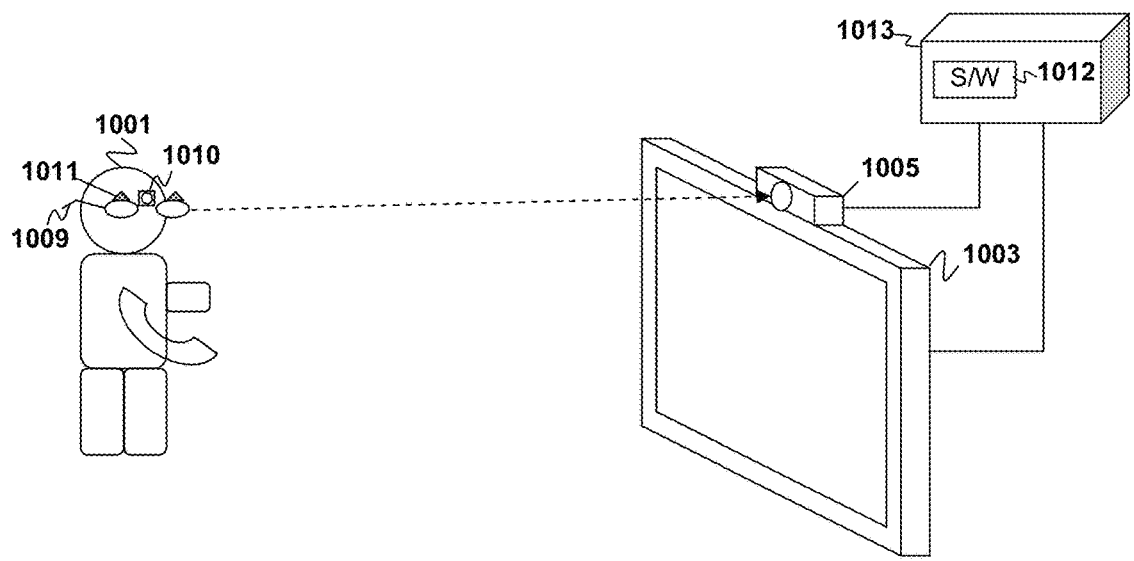

FIG. 10B provides another facial orientation characteristic tracking setup. In FIG. 10B, the user 1001 is facing a camera 1005 mounted on top of a visual display 1003. The user 1001 is simultaneously wearing a pair of glasses 1009 (e.g., a pair of 3D shutter glasses) with a pair of spaced-apart infrared (IR) light sources 1011 (e.g., one IR LED on each lens of the glasses 1009). The camera 1005 may be configured to capture the infrared light emanating from the light sources 1011, and then triangulate user's head tilt angle from the information obtained. Because the position of the light sources 1011 will not vary significantly with respect to its position on the user's face, this setup will provide a relatively accurate estimation of the user's head tilt angle.

The glasses 1009 may additionally include a camera 1010 which can provide images to the processor 1013 that can be used in conjunction with the software 1012 to find the location of the visual display 1003 or to estimate the size of the visual display 203. By way of example, and not by way of limitation, the visual display be of a known type having known vertical and horizontal screen dimensions. A test image of a known size relative to the screen may be displayed. Images of the test image may be obtained by the camera and analyzed to determine the orientation and dimensions of the test image in the images obtained by the camera 1010. Gathering this information allows the system to normalize the user's facial orientation characteristic data so that calculation of those characteristics is independent of both the absolute locations of the display 1003 and the user 1001. Moreover, the addition of the camera will allow the system to more accurately estimate visible range. Thus, FIG. 2B illustrates an alternative setup for determining a user's head tilt angle according to an aspect of the present disclosure. In some embodiments, separate cameras may be mounted to each lens of the glasses 1009 facing toward the user's eyes to facilitate gaze tracking by obtaining images of the eyes showing the relative location of the pupil with respect to the centers or corners of the eyes, e.g., as discussed above. The relatively fixed position of the glasses 1009 relative to the user's eyes facilitates tracking the user's eye gaze angle $\theta_E$ independent of tracking of the user's head orientation $\theta_H$.

Figure 10C:
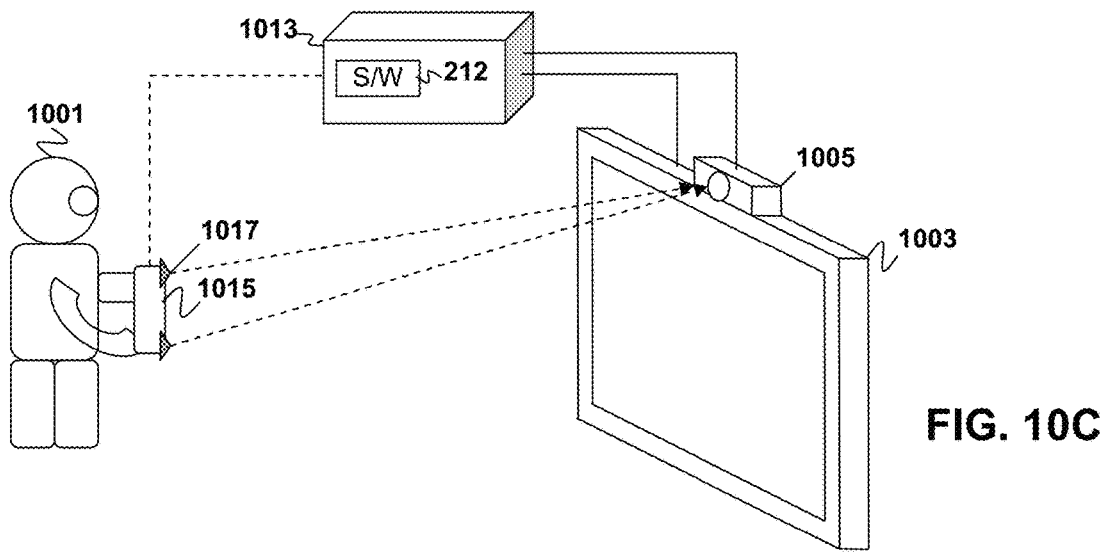

FIG. 10C provides a third facial orientation characteristic tracking setup. In FIG. 10C, the user 1001 is facing a camera 1005 mounted on top of a visual display 1003. The user is also holding a controller 1015 with one or more cameras 1017 (e.g., one on each side) configured to facilitate interaction between the user 1001 and the contents on the visual display 1003.

Images from the camera 1017 may be analyzed to determine the location of the visual display 1003 or to estimate the size of the visual display 1003, e.g., using a displayed test image as in the above example. Gathering this information allows the system to normalize the user's facial orientation characteristic data so that calculation of those characteristics is independent of both the absolute locations of the display 1003 and the user 1001. Moreover, the addition of the cameras 1017 to the controller 1015 allows the system to more accurately estimate visible range.

It is important to note that the setup in FIG. 10C may be further combined with the setup in FIG. 10A (not shown in FIG. 10C) in order to track the user's eye gaze direction in addition to tracking the user's head tilt angle while making the system independent of display size and location. Because the user's eyes are unobstructed in this setup, his eye gaze direction may be obtained through the infrared light reflection and capturing process discussed above.

Figure 10D:
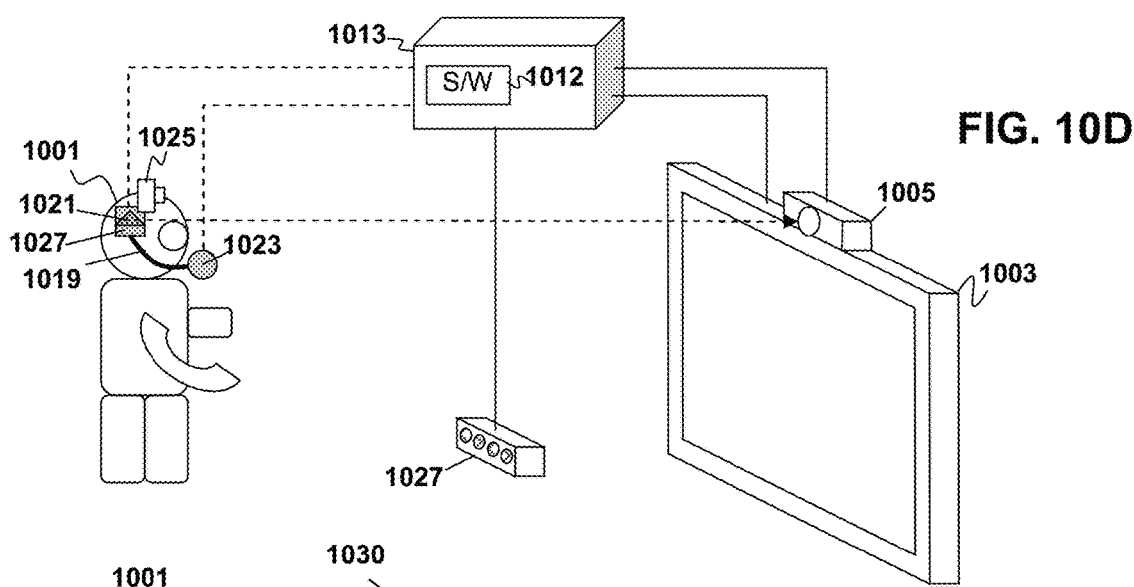

FIG. 10D provides yet another alternative facial orientation characteristic tracking setup. In FIG. 10D, the user 1001 is facing a camera 1005 mounted on top of a visual display 1003. The user 1001 is also wearing a headset 1019 with infrared light sources 1021 (e.g., one on each eyepiece) and a microphone 1023, the headset 1019 being configured to facilitate interaction between the user 1001 and the contents on the visual display 1003. Much like the setup in FIG. 10B, the camera 1005 may capture images of the infrared light emanating from the light sources 1021 on the headset 1019, and the user's head tilt angle may be triangulated from analysis the images obtained. Because the position of the headset 1019 tends not to vary significantly with respect to its position on the user's face, this setup can provide a relatively accurate estimation of the user's head tilt angle.

In addition to tracking the user's head tilt angle using the infrared light sensors 1021, the position of the user's head with respect to a specified target may also be tracked by a separate microphone array 1027 that is not part of the headset 1019. The microphone array 1027 may be configured to facilitate determination of a magnitude and orientation of the user's speech, e.g., using suitably configured software 1012 running on the processor 1013. Examples of such methods are described e.g., in commonly assigned U.S. Pat. No. 7,783,061, commonly assigned U.S. Pat. No. 7,809,145, and commonly-assigned U.S. Patent Application Publication number 2006/0239471, the entire contents of all three of which are incorporated herein by reference.

A detailed explanation of directional tracking of a user's speech using thermographic information may be found in U.S. patent application Ser. No. 12/889,347, to Ruxin Chen and Steven Osman filed Sep. 23, 2010 entitled "BLOW TRACKING USER INTERFACE SYSTEM AND METHOD", which is herein incorporated by reference. By way of example, and not by way of limitation, the orientation of the user's speech can be determined using a thermal imaging camera to detect vibration patterns in the air around the user's mouth that correspond to the sounds of the user's voice during speech. A time evolution of the vibration patterns can be analyzed to determine a vector corresponding to a generalized direction of the user's speech.

Using both the position of the microphone array 1027 with respect to the camera 1005 and the direction of the user's speech with respect to the microphone array 1027, the position of the user's head with respect to a specified target (e.g., display) may be calculated. To achieve greater accuracy in establishing a user's head tilt angle, the infrared reflection and directional tracking methods for determining head tilt angle may be combined. Alternative embodiments may additionally include an inertial sensor 1027, as described with respect to FIG. 1A above.

The headset 1019 may additionally include a camera 1025 configured to obtain images of the visual display 1003 that may be analyzed to find the location of the display and/or to estimate the size of the visual display 1003. Gathering this information allows the system to normalize the user's facial orientation characteristic data so that calculation of those characteristics is independent of both the absolute locations of the display 1003 and the user 1001. Moreover, the addition of the camera will allow the system to more accurately estimate visible range. In some embodiments, one or more cameras 1025 may be mounted to the headset 1019 facing toward the user's eyes to facilitate gaze tracking by obtaining images of the eyes showing the relative location of the pupil with respect to the centers or corners of the eyes, e.g., as discussed above. The relatively fixed position of the headset 1019 (and therefore, the camera(s) 1025) relative to the user's eyes facilitates tracking the user's eye gaze angle $\theta_E$ independent of tracking of the user's head orientation $\theta_H$.

It is important to note that the setup in FIG. 10D may be combined with the setup in FIG. 10A (not shown in FIG. 10D) in order to track the user's eye gaze direction in addition to tracking the user's head tilt angle. Because the user's eyes are unobstructed in this setup, his eye gaze direction may be obtained through infrared light reflection and capturing process discussed above.

Figure 10E:
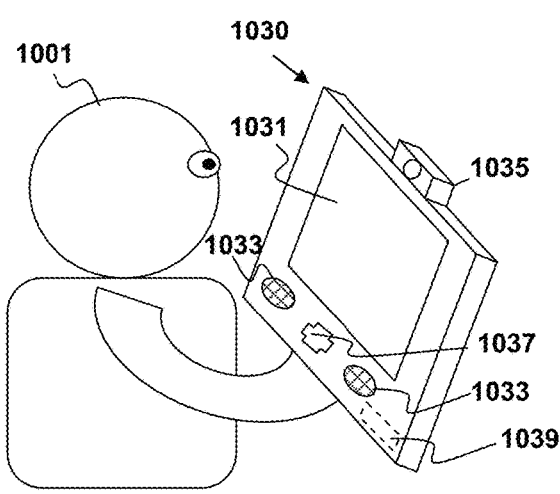
FIG. 10E is a schematic diagram illustrating a portable device that can utilize facial orientation tracking according to an aspect of the present disclosure.

Embodiments of the present invention can also be implemented in hand-held devices, such as cell phones, tablet computers, personal digital assistants, portable internet devices, or portable game devices, among other examples. FIG. 10E illustrates one possible example of determining eye gaze direction in the context of a hand-held device 1030. The device 1030 generally includes a processor 1039 which can be programmed with suitable software, e.g., as described above. The device 1030 may include a display screen 1031 and camera 1035 coupled to the processor 1039. One or more microphones 1033 and control switches 1037 may also be optionally coupled the processor 1039. The microphone 1033 may be part of a microphone array. The control switches 1037 can be of any type normally used with the particular type of hand-held device. For example, if the device 1030 is a cell phone, the control switches 237 may include a numeric keypad or alpha-numeric keypad, touch screen, or touch pad, as commonly used in such devices. Alternatively, if the device 1030 is a portable game unit, the control switches 1037 may include digital or analog joysticks, digital control switches, triggers, and the like. In some embodiments, the display screen 1031 may be a touch screen interface and the functions of the control switches 1037 may be implemented by the touch screen in conjunction with suitable software, hardware or firmware. The camera 1035 may be configured to face the user 1001 when the user looks at the display screen 1031. The processor 1039 may be programmed with software to implement head pose tracking and/or eye-gaze tracking. The processor may be further configured to utilize head pose tracking and/or eye-gaze tracking information, e.g., as discussed above.

It is noted that the display screen 1031, microphone(s) 1033, camera 1035, control switches 1037 and processor 1039 may be mounted to a case that can be easily held in a user's hand or hands. In some embodiments, the device 1030 may operate in conjunction with a pair of specialized glasses, which may have features in common with the glasses 1009 shown in FIG. 10B and described hereinabove. Such glasses may communicate with the processor through a wireless or wired connection, e.g., a personal area network connection, such as a Bluetooth network connection. In some embodiments, the device 1030 may be used in conjunction with a headset, which can have features in common with the headset 1019 shown in FIG. 10D and described hereinabove. Such a headset may communicate with the processor through a wireless or wired connection, e.g., a personal area network connection, such as a Bluetooth network connection. The device 1030 may include suitable antenna and transceiver to facilitate wireless network connection.

It is noted that the examples depicted in FIGS. 10A-10E are only a few examples of many setups that could be used to track a user's facial orientation characteristics in accordance with aspects of the present disclosure. Similarly, various body and other facial orientation characteristics in addition to the head tilt angle and eye gaze direction described above may be tracked to facilitate the adjustment of regions of interest rendered on a display.

Additional Aspects

Aspects of the present disclosure also include a non-transitory computer-readable medium having computer executable instructions embodied therein that, when executed, implement graphics processing in accordance with the above-mentioned aspects, e.g., as described above with respect to FIG. 1A, FIG. 2, FIG. 4A, FIG. 4B, FIG. 5A, FIG. 5B, and FIGS. 6A-6D. Examples of suitable computer-readable media include, but are not limited to RAM, ROM, hard disk, flash drive, SDRAM, CD-ROM, Blu-Ray, magnetic tape, and floppy disk.

CONCLUSION

It is noted that aspects of the present disclosure have been described with reference to eye tracking devices that use infrared light sources, which has developed as a relatively standard light source for optical eye tracking techniques. However, it is understood that other implementations are possible. For example, in implementations of the present disclosure, other invisible light sources are possible, such as ultraviolet light. By way of further example, in implementations of the present disclosure, visible light sources are possible for eye illumination, although it may be desirable to use invisible light sources in order to avoid distracting a user.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "a", or "an" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A method comprising:
obtaining gaze tracking data representing a user's gaze with respect to one or more images transmitted to a user;
analyzing the gaze tracking data to determine one or more regions of interest;
and adjusting compression of the one or more transmitted images so that fewer bits are needed to transmit data for portions of an image outside the one or more regions interest than for portions of the image within the one or more regions of interest by ignoring packet loss for transmission of data for one or more parts of the image outside the one or more regions of interest of the one or more transmitted images.

2. The method of claim 1, wherein adjusting the compression includes selectively compressing the image so that the one or more regions of interest undergo less compression than portions of the image outside the one or more regions of interest.

3. The method of claim 1, wherein selectively compressing the image includes using a higher quantization parameter for portions of the image that are outside the regions of interest than for portions of the image within the one or more regions of interest.

4. The method of claim 1, further comprising reducing transmission power for transmitting the one or more transmitted images for a period of time during which the user blinks or the user's vision undergoes a saccade.

5. The method of claim 1, further comprising ceasing transmission of the one or more images for time period during which the user blinks.

6. The method of claim 1, further comprising ceasing transmission of the one or more images for a time period during which a user's vision undergoes a saccade.

7. The method of claim 1, wherein said analyzing the gaze tracking data includes analyzing a rotational velocity and/or rotational acceleration of the user's eye.

8. The method of claim 1, wherein said analyzing the gaze tracking data includes analyzing information related to movement of the user's eyelid.

9. The method of claim 1, wherein said analyzing the gaze tracking data to determine an onset and duration of a vision tracking event includes analyzing previous gaze tracking data to improve detection and estimates of duration estimation for vision interrupting events.

10. The method of claim 1, further comprising reducing transmission power for transmitting the one or more transmitted images for a period of time during which the user blinks or the user's vision undergoes a saccade and subsequently increasing transmission power.

11. The method of claim 1, further comprising generating the one or more transmitted images by generating foveated image data representing one or more foveated images using foveation data representing one or more regions of interest of the image determined from the gaze tracking data, wherein the one or more foveated images are characterized by level of detail within the one or more regions of interest and lower level of detail outside the one or more regions of interest.

12. The method of claim 11, wherein the foveation data includes data representing vertex density in the one or more regions of interest.

13. The method of claim 11, wherein the foveation data includes data representing pixel resolution in the one or more regions of interest.

14. The method of claim 11, further comprising determining one or more gaze tracking error parameters from the gaze tracking data;
generating adjusted foveation data representing an adjusted size and/or shape of one or more regions of interest in one or more images to be subsequently presented to the user based on the one or more gaze tracking parameters;
generating foveated image data representing one or more foveated images using the adjusted foveation data, wherein the one or more foveated images are characterized by level of detail within the one or more regions of interest and lower level of detail outside the one or more regions of interest; and
presenting the one or more foveated images with the foveated image data to the user.

15. The method of claim 14, wherein determining one or more gaze tracking error parameters from the gaze tracking data includes determining a rate of rotation of a user's eye with respect to one or more axes.

16. The method of claim 14, wherein determining one or more gaze tracking error parameters from the gaze tracking data includes determining a rate of rotation of a user's eye with respect to one or more axes and determining an error in a fixation of the user's eye on a region of interest of the one or more regions of interest.

17. The method of claim 14, wherein determining one or more gaze tracking error parameters from the gaze tracking data includes determining a rate of rotation of a user's eye with respect to one or more axes and determining whether the user's eye is moving in smooth pursuit.

18. The method of claim 14, wherein determining one or more gaze tracking error parameters from the gaze tracking data includes determining a confidence interval regarding the current gaze position.

19. The method of claim 14, wherein determining one or more gaze tracking error parameters from the gaze tracking data includes determining the blink cycle of a user.

20. The method of claim 14, wherein determining one or more gaze tracking error parameters from the gaze tracking data includes determining the saccade cycle of a user.

21. The method of claim 14, wherein determining one or more gaze tracking error parameters from the gaze tracking data includes determining a transition in the gaze direction of a user as a result of a change in the depth of field of presented images.

22. The method of claim 14, wherein determining one or more gaze tracking error parameters from the gaze tracking data includes determining whether a user is color blind.

23. The method of claim 14, wherein determining one or more gaze tracking error parameters from the gaze tracking data includes determining a rate of rotation of a user's eye with respect to one or more axes and determining the level of gaze stability of the user's eye.

24. The method of claim 14, wherein determining one or more gaze tracking error parameters from the gaze tracking data includes determining a rate of rotation of a user's eye with respect to one or more axes and determining whether the user's eye movement is a precursor to the user's head movement.

25. The method of claim 14, wherein the adjusted foveation data includes data characterizing a particular region of interest of the one or more regions of interest, wherein the data characterizing the particular region of interest includes a foveation region and a transition region, wherein the foveation region is characterized by a higher level of detail than the transition region and the transition region is characterized by a higher level of detail than regions of a corresponding image outside the particular region of interest.

26. The method of claim 25, wherein generating adjusted foveation data representing an adjusted size and/or shape of one or more regions of interest includes adjusting a size of the transition region.

27. The method of claim 14, wherein the adjusted foveation data includes data representing vertex density in the one or more regions of interest.

28. The method of claim 14, wherein the adjusted foveation data includes data representing pixel resolution in the one or more regions of interest.

29. The method of claim 1 wherein the transmission of data includes transmission of data through local area networks (LAN), wireless LAN, personal area networks (PAN), wireless PAN, or wide area networks (WAN), wireless WAN, or wireless.

30. A system, comprising:
a processor;
a memory; and
computer-readable instructions embodied in the memory, the computer-readable instructions being configured to implement a method when executed, the method comprising:
obtaining gaze tracking data representing a user's gaze with respect to one or more images transmitted to a user;
analyzing the gaze tracking data to determine one or more regions of interest;
and adjusting compression of the one or more transmitted images so that fewer bits are needed to transmit data for portions of an image outside the one or more regions interest than for portions of the image within the one or more regions of interest by ignoring packet loss for transmission of data for one or more parts of the image outside the one or more regions of interest of the one or more transmitted images.

31. The system of claim 30 wherein the transmission of data includes transmission of data through local area networks (LAN), wireless LAN, personal area networks (PAN), wireless PAN, or wide area networks (WAN), wireless WAN, or wireless.

32. A non-transitory computer-readable medium having computer-readable instructions embodied therein, the computer-readable instructions being configured to implement a method when executed, the method comprising:
obtaining gaze tracking data representing a user's gaze with respect to one or more images transmitted to a user;
analyzing the gaze tracking data to determine one or more regions of interest;
and adjusting compression of the one or more transmitted images so that fewer bits are needed to transmit data for portions of an image outside the one or more regions interest than for portions of the image within the one or more regions of interest, by ignoring packet loss for transmission of data for one or more parts of the image outside the one or more regions of interest of the one or more transmitted images.

* * * * *